US 7,334,749 B2

(12) United States Patent
Terauchi et al.

(10) Patent No.: US 7,334,749 B2
(45) Date of Patent: Feb. 26, 2008

(54) ELECTRIC-POWERED FISHING REEL

(75) Inventors: Takashi Terauchi, Tokorozawa (JP); Akio Sekimoto, Iruma (JP)

(73) Assignee: Daiwa Seiko, Inc., Tokyo (JP)

( * ) Notice: Subject to any disclaimer, the term of this patent is extended or adjusted under 35 U.S.C. 154(b) by 471 days.

(21) Appl. No.: 11/103,476

(22) Filed: Apr. 12, 2005

(65) Prior Publication Data
US 2005/0247809 A1 Nov. 10, 2005

(30) Foreign Application Priority Data
Apr. 14, 2004 (JP) .......................... P2004-119537
Dec. 14, 2004 (JP) .......................... P2004-361070

(51) Int. Cl.
*A01K 89/01* (2006.01)
(52) U.S. Cl. ...................................... 242/250; 242/225
(58) Field of Classification Search ............... 242/225, 242/226, 250, 253, 255, 257, 263
See application file for complete search history.

(56) References Cited

U.S. PATENT DOCUMENTS 7,175,120 B2 * 2/2007 Ono .......................... 242/250
2005/0247809 A1 * 11/2005 Terauchi et al. ............ 242/250

* cited by examiner

*Primary Examiner*—Emmanuel M Marcelo
(74) *Attorney, Agent, or Firm*—Sughrue Mion, PLLC.

(57) ABSTRACT

An electrically-powered fishing reel includes a drive motor which rotationally drives a spool, and a speed change unit connected between an output section of the drive motor and a power transmission mechanism which transmits a rotation of the output section to the spool, and provided with a high-speed-driving gear transmission mechanism and a low-speed-driving gear transmission mechanism, and the electrically-powered fishing reel is operative to select, according to the rotating direction of the drive motor, either one of the high-speed-driving gear transmission mechanism or the low-speed-driving gear transmission mechanism and vary the rotational speed of the spool. A high-speed-driving output gear of the high-speed-driving gear transmission mechanism is connected to a power transmission mechanism for the spool without a low-speed-driving output gear of the low-speed-driving gear transmission mechanism being inserted between the high-speed-driving output gear and the power transmission mechanism.

9 Claims, 16 Drawing Sheets

ELECTRIC-POWERED FISHING REEL

BACKGROUND OF THE INVENTION

The present invention relates to an electrically-powered fishing reel provided with a drive motor which rotationally drives a spool rotationally supported in a reel body.

Electrically-powered fishing reels (hereinafter referred to as the "electrically-powered reels") are widely used for fishing like boat fishing for catching fishes in deep water.

As is well known, this kind of electrically-powered reel is constructed to perform winding of a fishing line by rotating a spool by the drive of a spool drive motor (hereinafter referred to as the "spool motor"). As disclosed in Patent Document 1, an existing type of electrically-powered reel has an electrical speed change unit which controls, by the operation of a motor output adjustment member (adjustment lever) displaceably fitted on a reel body, the amount of current to be supplied to the spool motor to adjust the output of the spool motor and vary the winding speed of a fishing line, in order to effect fishing-line winding operation corresponding to the conditions of fishing places (for example, the size and the kind of fish to be caught, fights with fishes and the number of hits. Fishermen operate the motor output operation member according to the conditions, and perform fishing-line winding operation suitable for actual fishing.

However, this electrical speed change unit still has the problem that sufficient torque may not be obtained during low speed rotation, nor may superior high-speed winding performance be obtained, according to the setting conditions of the gear ratio of a gear power transmission mechanism which transmits the drive force of the spool motor to the spool.

To solve this problem, Patent Document 2 discloses an electrically-powered reel which includes, in addition to the above-mentioned electrical speed change unit, a mechanical speed change unit in which a high-speed-driving gear transmission mechanism and a low-speed-driving gear transmission mechanism each having a different gear ratio are connected for transmission of power to each other between the motor shaft of a spool motor and a power transmission mechanism which transmits a rotation of the motor shaft to a spool, and either one of the high-speed-driving gear transmission mechanism or the low-speed-driving gear transmission mechanism is made able to transmit power so as to vary the rotational speed of the spool, by varying the rotating direction of the spool motor by the operation of a high-speed mode switch and a low-speed mode switch provided on an operation panel of a reel body.

Therefore, rapid speed change operation corresponding to conditions is needed when winding operation is to be performed in actual fishing places.

However, in the case of the electrically-powered reel of Patent Document 2 which includes the electrical speed change unit and the mechanical speed change unit, the switching of the mechanical speed change unit needs to be performed by the pressing operation of the high-speed mode switch and the low-speed mode switch, and the output adjustment of the electrical speed change unit needs to be separately performed by the displacement operation of the motor output adjustment member fitted in the reel body. Accordingly, speed change operation becomes complicated and time-consuming, so that there is the risk that a fisherman cannot rapidly find a response from a fish and appropriately cope with the movement of the fish, and allows the fish to escape.

Electrically-powered fishing reels are typically provided with speed change units so that winding operations corresponding to different conditions can be effected. A generally known example of the speed change units is a speed change unit which controls the amount of current to be supplied to a drive motor to perform adjustment to increase or decrease the motor output, thereby varying the rotational speed of a spool.

Patent Document 3 discloses a construction in which a high-speed-driving gear transmission mechanism and a low-speed-driving gear transmission mechanism are connected between a motor output section and a spool power transmission mechanism in such a manner that either one of the mechanisms can be selected to effect switching between high-speed-power transmission and low-speed-power transmission according to the rotating direction of the motor, so that electrically-powered winding operation corresponding to variations in the conditions of a fishing place can be effected. Namely, power transmission gear systems having different gear ratios are constructed so that the rotational speed of the motor to be transmitted to a spool as power, i.e., the winding speed of the spool, can be switched between two speeds, a low-speed-power transmission state and a high-speed-power transmission state, by varying the rotating direction of the motor to select either one of the high- or low-speed-power transmission states.

In the construction disclosed in the above-mentioned Patent Document 3, as shown in FIG. 18, the low-speed-power transmission mechanism is constructed to transmit the output from the motor 314 to a transmission shaft 324 disposed on the same axis as a low-speed gear, via the low-speed gear 322 which meshes with a motor gear 320 (pinion gear) fixed to the motor shaft, and then transmits the output to the spool side via a power transmission mechanism 315 disposed on the rotating shaft 324. On the other hand, the high-speed-power transmission mechanism is constructed to transmit the output from the motor to a large-diameter intermediate gear 335 disposed on the same axis as a high-speed gear 325, via the high-speed gear 325 which meshes with the motor gear 320 (pinion gear) fixed to the motor shaft, and then transmits the output to a small-diameter intermediate gear 329 disposed on the rotating shaft 324, thereby increasing the rotational speed of the rotating shaft 324 (by the gear ratio of the large-diameter intermediate gear 335 to the small-diameter intermediate gear 329).

Namely, in the above-mentioned construction, the high-speed-driving gear transmission mechanism transmits an increased rotation to the gears (the gears 322 and 329) disposed for low-speed driving, so that mesh noise during high-speed driving becomes large and gives fishermen uncomfortable sensations and there also occur problems such as the abrasion of the gears disposed for low-speed driving and bearing sections therefor. In a loaded state during high-speed driving, mesh noise in particular becomes far larger, and large load is applied to the gears disposed for low-speed driving and the bearing sections therefor.

Patent Document 3: JP-A-2001-148978
Patent Document 1: Patent No. 2,977,978
Patent Document 2: JP-A-2001-148978

SUMMARY OF THE INVENTION

The invention has been made in view of the above-described problem, and an object of the invention is to provide an electrically-powered reel which has an electrical speed change unit and a mechanical speed change unit and is improved so that both speed change units can perform rapid and appropriate speed change operation according to conditions.

Another object of the invention is to provide an electrically-powered fishing reel capable of effecting switching between low-speed driving and high-speed driving by means of a simple structure, and also capable of reducing gear mesh noise during electrical driving and realizing comfortable high-speed winding.

To achieve the above object, an electrically-powered fishing reel according to the invention includes a drive motor which rotationally drives a fishing-line winding spool rotatably supported in a reel body, and a speed change unit connected between an output section of the drive motor and a power transmission mechanism which transmits a rotation of the output section to the spool, and provided with a high-speed-driving gear transmission mechanism and a low-speed-driving gear transmission mechanism, and the electrically-powered fishing reel is operative to select, according to a rotating direction of the output section of the drive motor, either one of the high-speed-driving gear transmission mechanism or the low-speed-driving gear transmission mechanism and vary a rotational speed of the spool. In the electrically-powered fishing reel, a high-speed-driving output gear of the high-speed-driving gear transmission mechanism is connected to a power transmission mechanism for the spool without a low-speed-driving output gear of the low-speed-driving gear transmission mechanism being inserted between the high-speed-driving output gear and the power transmission mechanism.

(1) An electrically-powered fishing reel comprising:
   a drive motor that drives a rotation of a spool rotatably supported by a reel body;
   a mechanical speed change unit that is fitted in a drive system of the spool and switches transmission power from the drive motor to the spool between a high speed state and a low speed state;
   an electrical speed change unit that controls an amount of current to be supplied to the drive motor and performs adjustment to increase or decrease an output of the drive motor; and
   a motor output adjustment member that is fitted on the reel body and is displaceable by a predetermined displacement operation range,
   wherein the motor output adjustment member controls the electrical speed change unit to perform the adjustment by a displacement operation of the motor output adjustment member, and
   wherein the motor output adjustment member controls the mechanical speed change unit to switch the transmission power between the high speed state and the low speed state by the displacement operation within the predetermined displacement operation range.

(2) The electrically-powered fishing reel according to (1), wherein
   the motor output adjustment member is fitted to the reel body so as to be able to rotate by a predetermined range,
   when the motor output adjustment member is rotated to a predetermined rotational operation position, the mechanical speed change unit switches the transmission power from the low speed state to the high speed state,
   a first-half rotational operation range preceding the rotational operation position is a motor output increase/decrease adjustment range of the electrical speed change unit in the low speed state, and
   a second-half rotational operation range succeeding the rotational operation position is a motor output increase/decrease adjustment range of the electrical speed change unit in the high speed state of the mechanical speed change unit.

(3) The electrically-powered fishing reel according to (1), wherein a speed of the rotation of the spool at the time that the low speed state is switched to the high speed state is continuous.

(4) The electrically-powered fishing reel according to (1), wherein the motor output adjustment member includes a rotatably lever.

(5) The electrically-powered fishing reel according to (1) wherein the motor output adjustment member includes a slidable switch.

(6) An electrically-powered fishing reel comprising:
   a drive motor that drives a rotation of a spool rotatably supported by a reel body; and
   a speed change unit that is connected between an output section of the drive motor and a power transmission mechanism for transmitting a rotation of the output section to the spool, and is provided with a high-speed-driving gear transmission mechanism and a low-speed-driving gear transmission mechanism,
   wherein one of the high-speed-driving gear transmission mechanism and the low-speed-driving gear transmission mechanism is selected to vary a rotational speed of the spool according to a rotating direction of the output section of the drive motor,
   wherein the high-speed-driving gear transmission mechanism includes a high-speed-driving output gear which is driven when the high-speed-driving gear transmission mechanism is selected, and the low-speed-driving gear transmission mechanism includes a low-speed-driving output gear which is driven when the low-speed-driving gear transmission mechanism is selected, and
   wherein the high-speed-driving output gear is connected to the power transmission mechanism without the low-speed-driving output gear being inserted between the high-speed-driving output gear and the power transmission mechanism.

(7) The electrically-powered fishing reel according to (6) wherein
   the high-speed-driving gear transmission mechanism includes a first rotating shaft to which the high-speed-driving output gear is fixed,
   the first rotating shaft is common to an input shaft of the power transmission mechanism,
   the low-speed-driving gear transmission mechanism includes a second rotating shaft to which the low-speed-driving output gear is fixed and which is apart from the first rotating shaft, and
   the high-speed-driving output gear is meshed with the low-speed-driving output gear.

(8) The electrically-powered fishing reel according to (7), wherein the high-speed-driving output gear is a large-diameter gear and the low-speed-driving output gear is a small diameter gear smaller than the large-diameter gear.

(9) An electrically-powered fishing reel comprising:
   a drive motor that drives a rotation of a spool rotatably supported by a reel body; and
   a speed change unit that is connected between an output section of the drive motor and a power transmission mechanism for transmitting a rotation of the output section to the spool, and provided with a high-speeddriving gear transmission mechanism and a low-speed-driving gear transmission mechanism;

wherein one of the high-speed-driving gear transmission mechanism and the low-speed-driving gear transmission mechanism is selected according to a rotating direction of the output section of the drive motor to transmit one of high-speed rotational drive force and low-speed rotational drive force to the power transmission mechanism, and wherein the high-speed-driving gear transmission mechanism transmits a rotation of the drive motor in one direction to the power transmission mechanism without increasing the speed of the rotation, and the low-speed-driving gear transmission mechanism transmits a rotation of the drive motor in the other direction to the power transmission mechanism while decreasing the speed of the rotation.

According to the above-mentioned electrically-powered fishing reel, either one of the high-speed-driving gear transmission mechanism or the low-speed-driving gear transmission mechanism is selected by switching the rotating direction of the drive motor. In this case, since the high-speed-driving gear transmission mechanism does not perform a speed-increasing action exceeding the rotational speed of the drive motor, gear mesh noise due to electrically-powered driving is reduced, whereby comfortable high-speed winding can be realized.

According to the invention, it is possible to provide an electrically-powered fishing reel capable of effecting switching between low-speed driving and high-speed driving by means of a simple structure, and also capable of reducing gear mesh noise during electrical driving and realizing comfortable high-speed winding.

DETAILED DESCRIPTION OF PREFERRED EMBODIMENTS

Preferred embodiments of the invention will be described below with reference to the accompanying drawings.

First Embodiment

Figure 1:
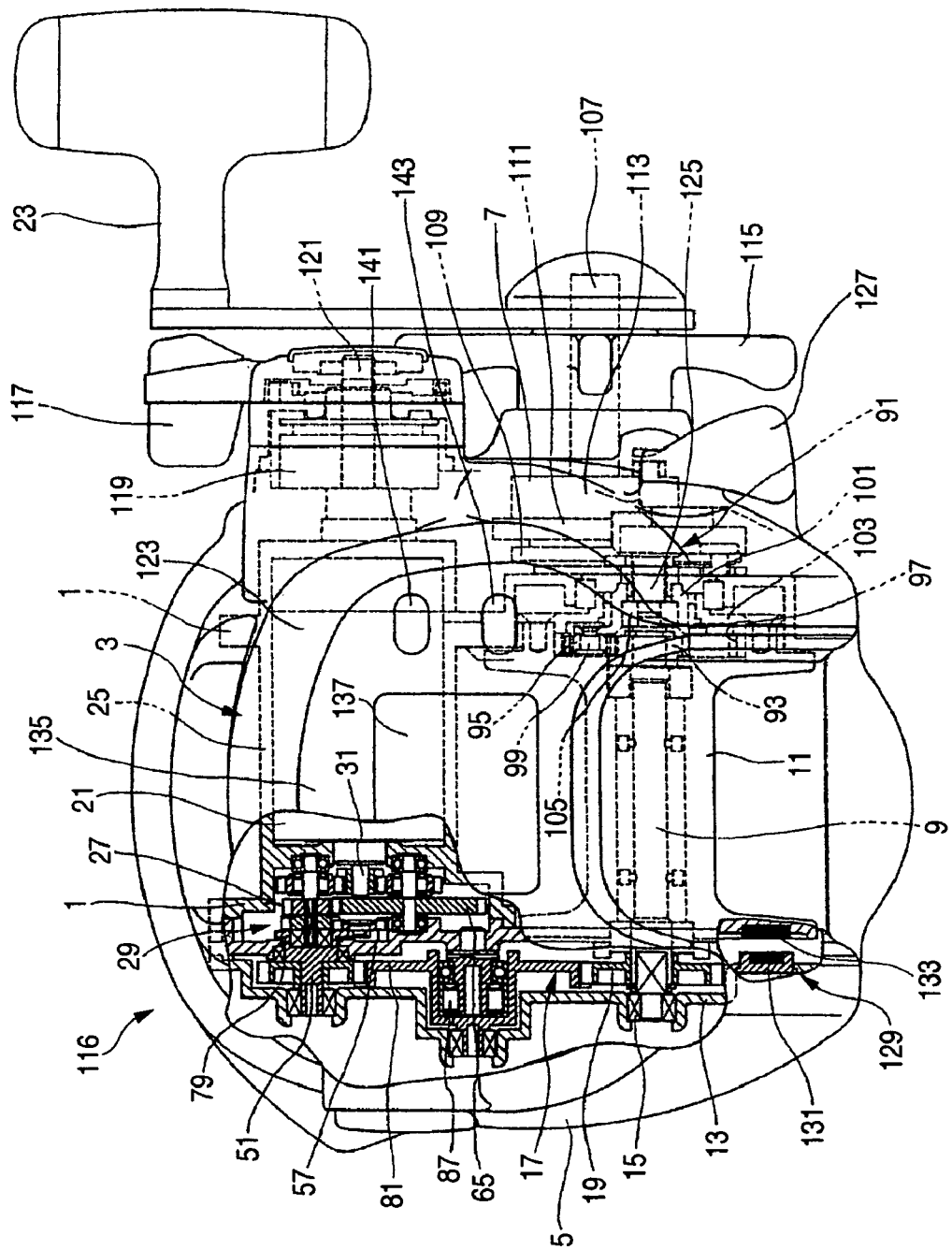
FIG. 1 is a partly cutaway plane view of an electrically-powered reel according to a first embodiment.

FIGS. 1 to 9 show an electrically-powered reel according to a first embodiment as in claim 1 and claim 2. In FIG. 1, reference numeral 1 denotes a frame of a reel body 3, and reference numerals 5 and 7 denote side plates secured to the left and right sides of the frame 1. A spool 11 is rotatably supported by a spool shaft 9 between both side plates 5 and 7.

The spool shaft 9 extends through the axis of the spool 11, and one end of the spool shaft 9 on the side of the side plate 5 is rotatably supported via a bearing 15 on a first set plate 13 which is integrally secured to the frame 1. A spool shaft drive gear 19 of a power transmission mechanism 17 which will be described later is nonrotatably fitted on the one end of the spool shaft 9.

Figure 2:
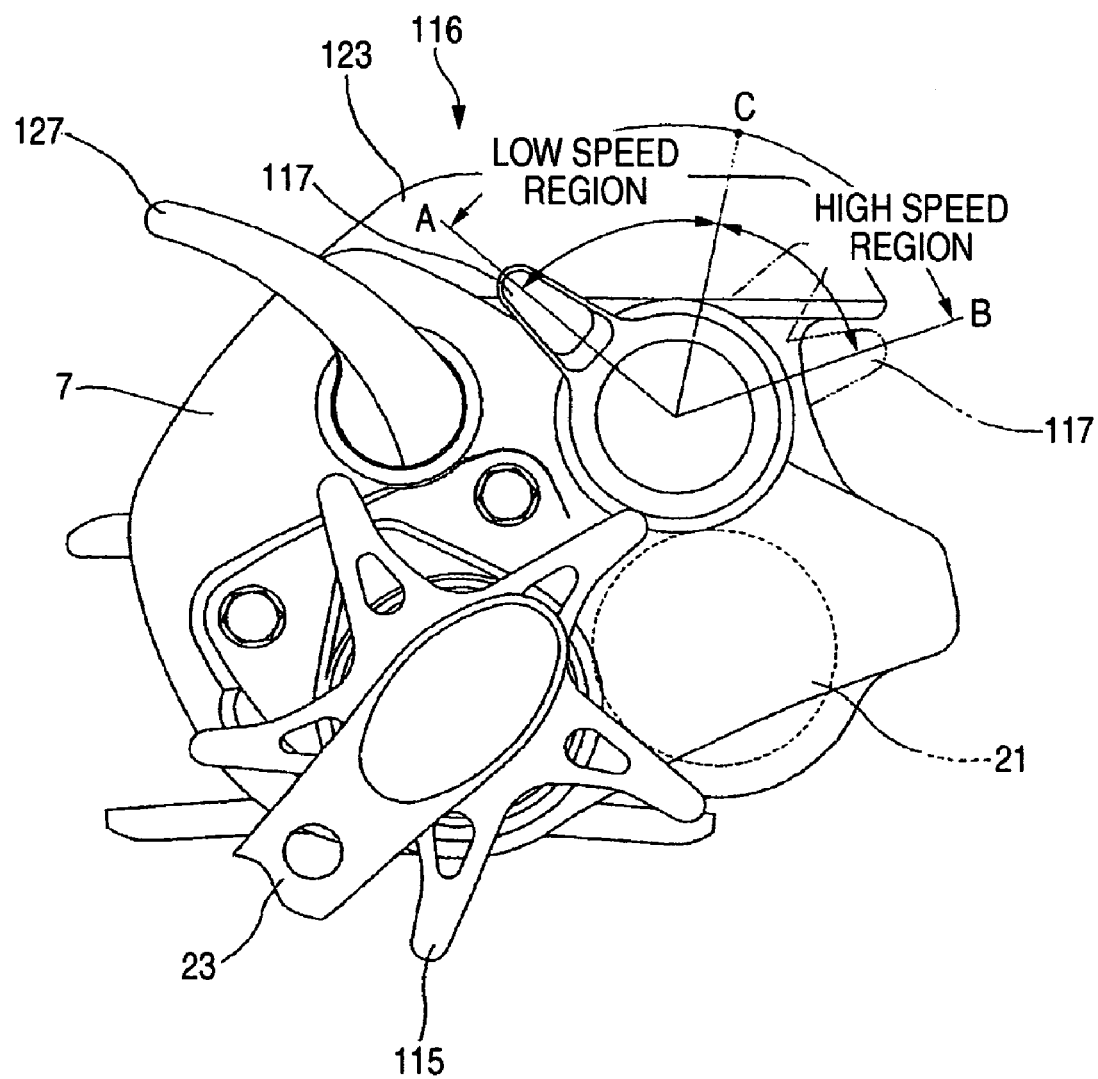
FIG. 2 is a side view of the electrically-powered reel shown in FIG. 1.

The spool 11 is constructed to wind a fishing line thereon by being rotated in the winding direction by the drive of a spool motor 21 and by the winding operation of a handle 23. As shown in FIGS. 1 and 2, the spool 11 is accommodated in a cylindrical motor case 25 formed integrally with the frame 1 forward of the spool 11.

On the side of the side plate 5 in the reel body 3, a mechanical speed change unit 27 and a first speed reduction mechanism 29 which transmit the torque of the spool motor 21 to the spool shaft 9, and a power transmission mechanism 17 which is made of a plurality of gears including the spool shaft drive gear 19 are fitted in named order between a motor shaft (motor output section) 31 of the spool motor 21 and the spool shaft 9 so that the torque of the spool motor 21 is transmitted to the spool shaft 9 while being changed/reduced in rotational speed through the mechanical speed change unit 27, the first speed reduction mechanism 29 and the power transmission mechanism 17.

Figure 3:
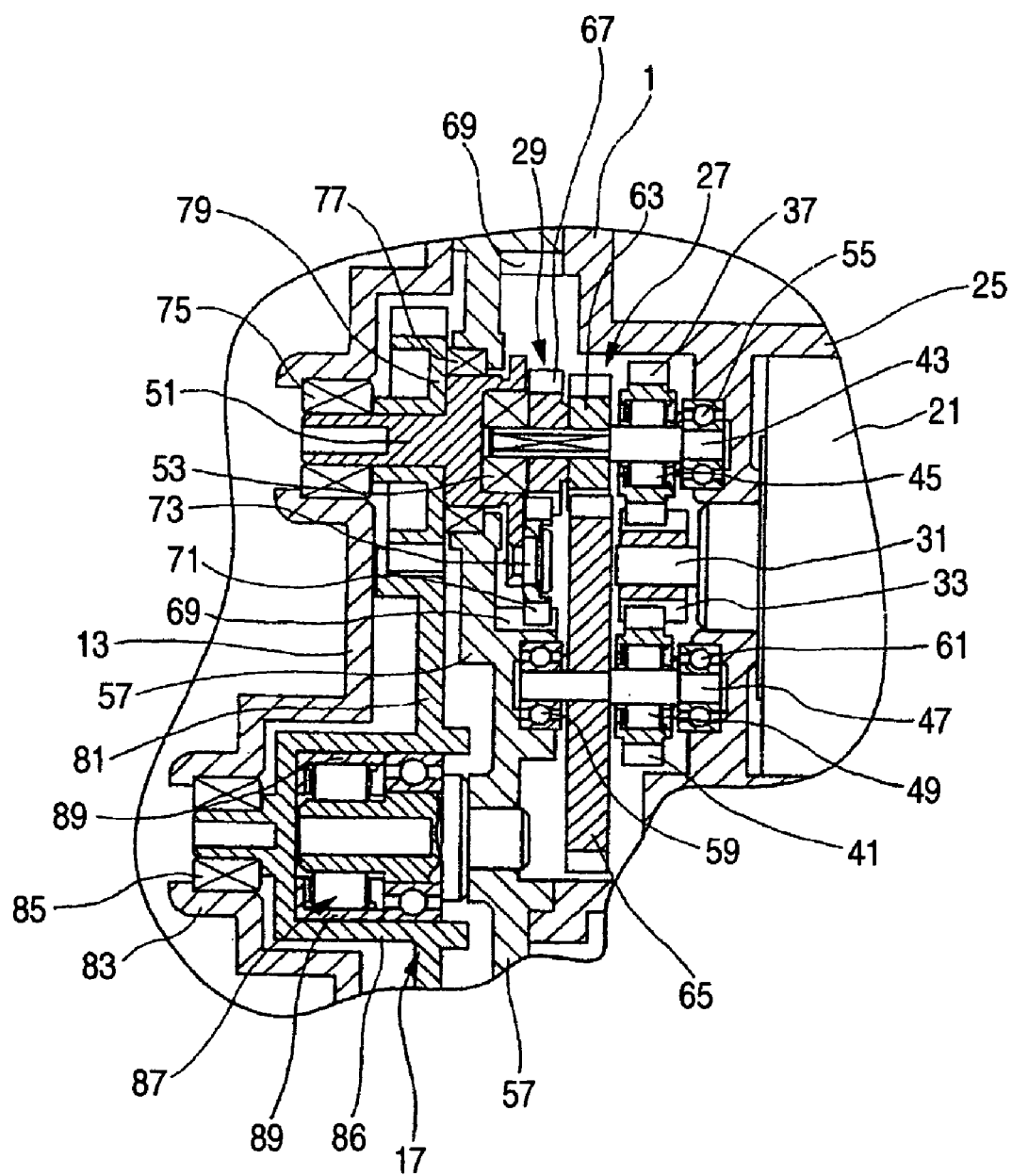
FIG. 3 is a partly enlarged cross-sectional view of the electrically-powered reel shown in FIG. 1.
Figure 4:
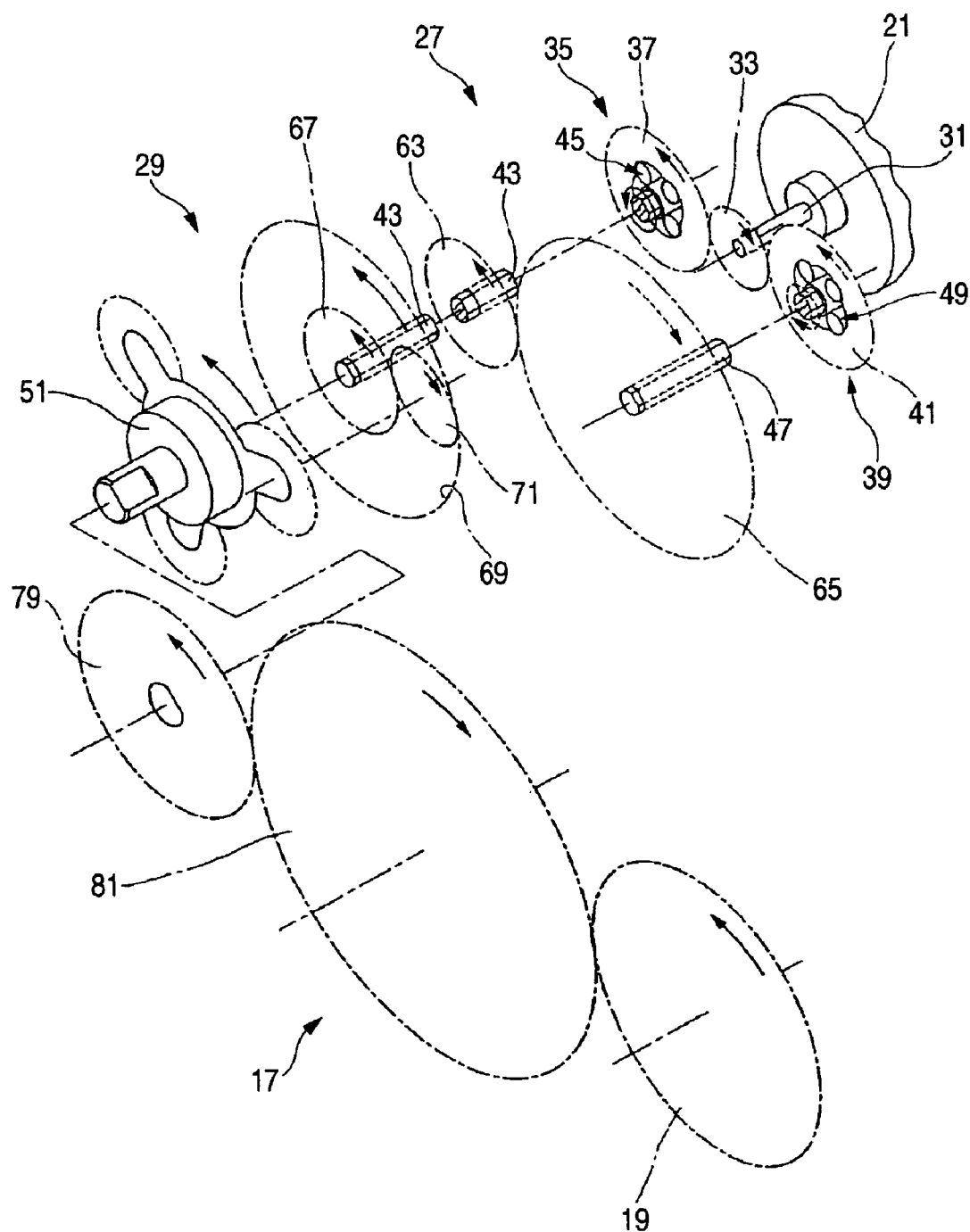
FIG. 4 is a schematic view for explaining the rotating directions of gears of each of a mechanical speed change unit, a speed reduction mechanism and a power transmission mechanism.
Figure 5:
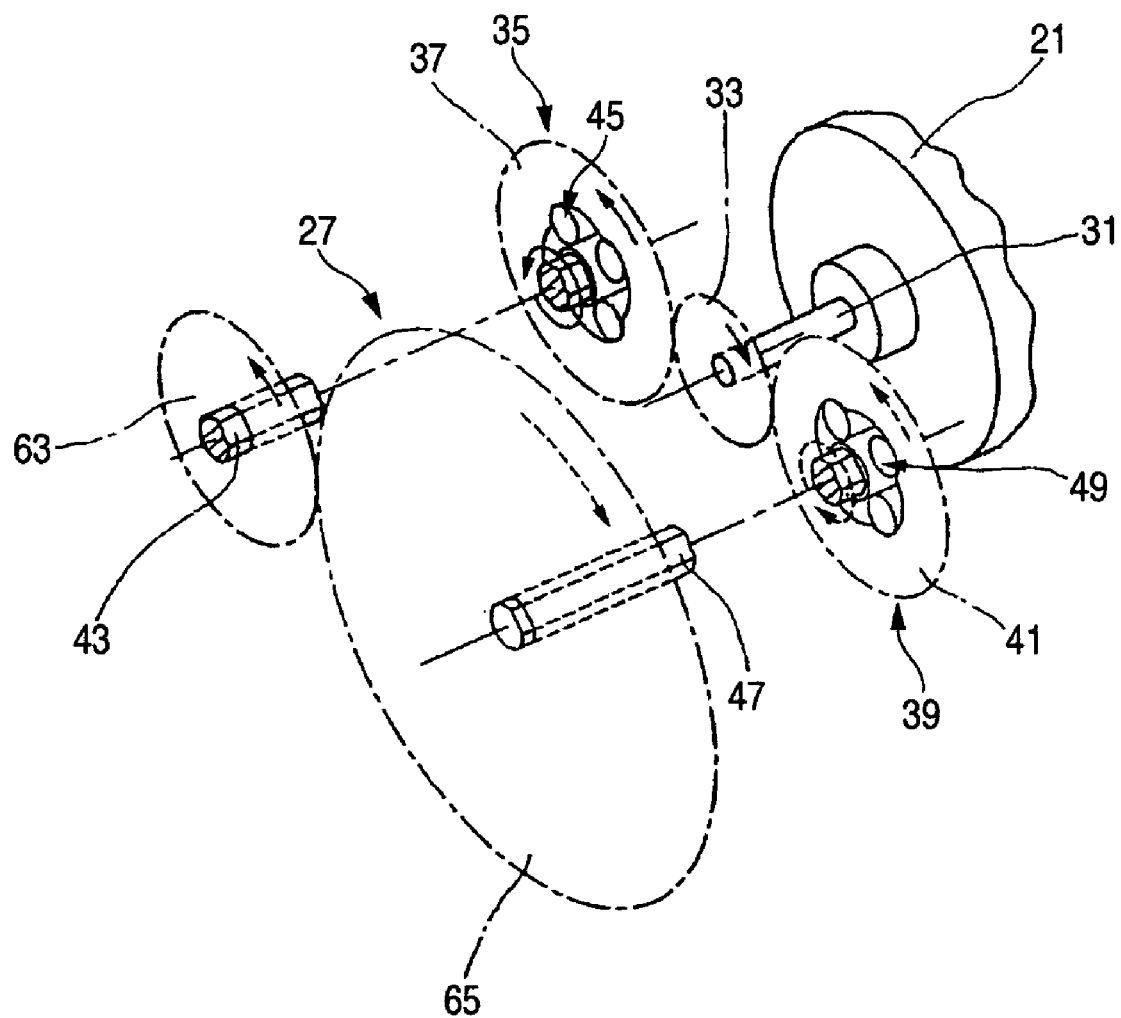
FIG. 5 is a schematic view for explaining the rotating directions of the gears of each of the mechanical speed change unit and the speed reduction mechanism.
Figure 6:
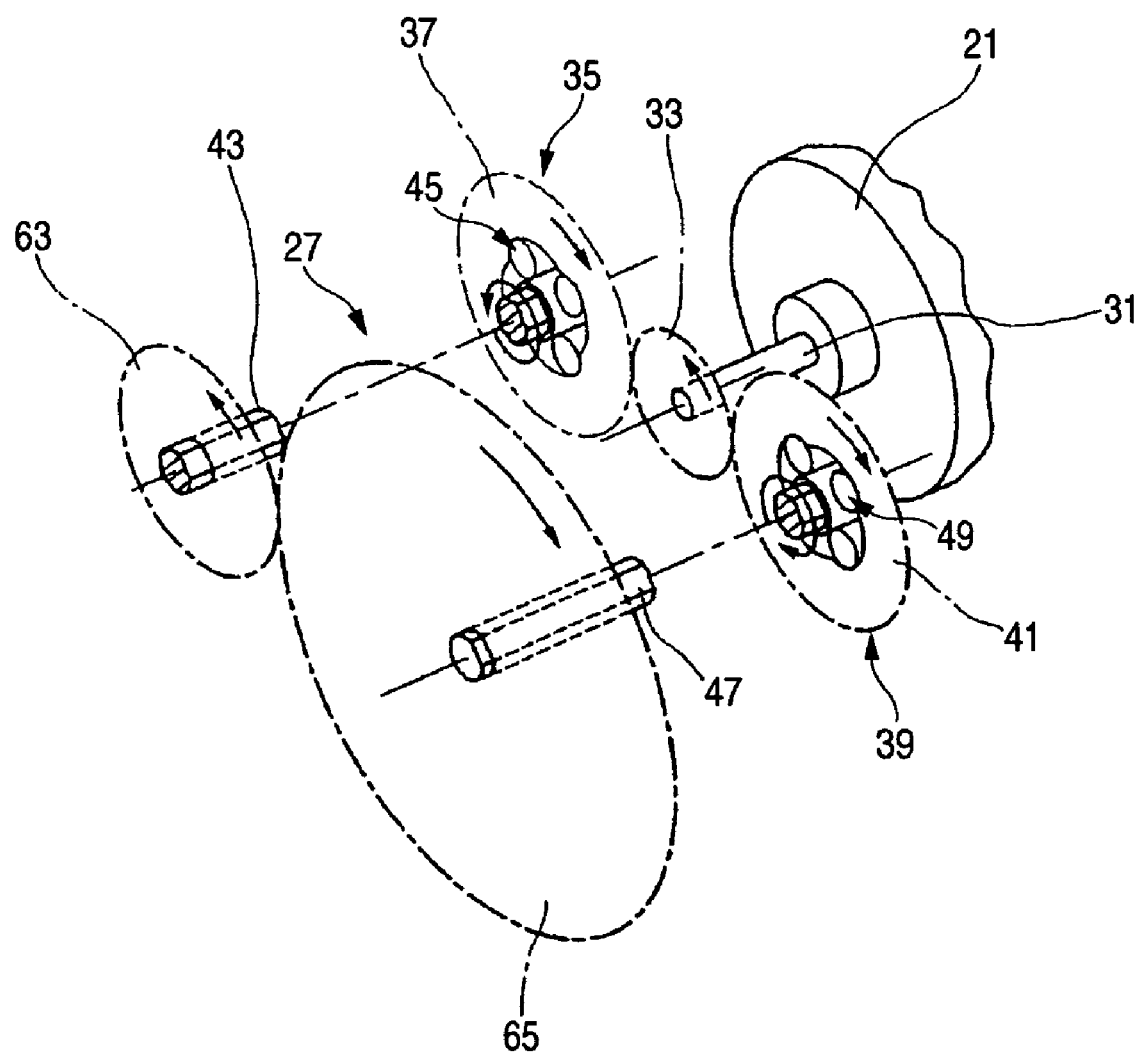
FIG. 6 is a schematic view for explaining the rotating directions of the gears of each of the mechanical speed change unit and the speed reduction mechanism.

FIG. 3 is a magnified cross-sectional view of the mechanical speed change unit 27 and the first speed reduction mechanism 29. FIG. 4 is a schematic view for explaining the rotating directions of the respective gears of each of the mechanical speed change unit 27, the first speed reduction mechanism 29 and the power transmission mechanism 17. In FIGS. 3 and 4, reference numeral 33 denotes a pinion nonrotatably fitted on the motor shaft 31, and the spool motor 21 is constructed to rotate in both forward and reverse directions and the pinion 33 is also constructed to rotate in both forward and reverse directions according to the forward and reverse rotations of the spool motor 21, as shown in FIGS. 4 to 6.

A low-speed-driving gear 37 of a low-speed-driving speed reduction gear mechanism 35 and a high-speed-driving gear 41 of a high-speed-driving speed reduction gear mechanism 39 individually mesh with the pinion 33, and the mechanical speed change unit 27 is made of the low-speed-driving speed reduction gear mechanism 35 and the high-speed-driving speed reduction gear mechanism 39.

The outside diameter of the low-speed-driving gear 37 and the outside diameter of the high-speed-driving gear 41 are set to be the same (the gear ratio of the low-speed-driving gear 37 to the pinion gear 33 and the gear ratio of the high-speed-driving gear 41 to the pinion 33 are set to be the same.) As shown in FIGS. 3 and 4, the low-speed-driving gear 37 is supported for rotation about a first rotating shaft 43 by a one-way clutch 45, and the high-speed-driving gear 41 is supported for rotation about a second rotating shaft 47 by a one-way clutch 49. The first rotating shaft 43 is rotatably supported by bearings 53 and 55 between a frame 25 and a carrier 51 of the first speed reduction mechanism 29, and the second rotating shaft 47 is rotatably supported by bearings 59 and 61 between the frame 1 and a second set plate 57 which is disposed inside the first set plate 13.

The first one-way clutch 23 and the second one-way clutch 26 are constructed so that their rotating directions to transmit power are set opposite to each other. When the low-speed-driving gear 37 rotates in the reverse direction (rotates in the counterclockwise direction as viewed in FIGS. 4 and 5; the term "reverse" as used hereinafter represents "counterclockwise"), the one-way clutch 45 on the side of the low-speed-driving gear 37 transmits the torque of the low-speed-driving gear. 37 to the first rotating shaft 43 by its engagement function. When the low-speed-driving gear 37 rotates in the forward direction (rotates in the clockwise direction as viewed in FIG. 6; the term "forward" as used hereinafter represents "clockwise"), the one-way clutch 45 does not transmit the torque of the low-speed-driving gear 37 to the first rotating shaft 43.

On the other hand, when the high-speed-driving gear 41 rotates in the forward direction, the one-way clutch 49 on the side of the high-speed-driving gear 41 transmits the torque of the high-speed-driving gear 41 to the second rotating shaft 47 by its engagement function, and when the high-speed-driving gear 41 rotates in the reverse direction, the one-way clutch 49 does not transmit the torque of the high-speed-driving gear 41 to the second rotating shaft 47.

A small gear 63 is nonrotatably fitted on the first rotating shaft 43, and a large gear 65 is nonrotatably fitted on the second rotating shaft 47. These small gear 63 and the large gear 65 mesh with each other, and a sun gear 67 of the first speed reduction mechanism 29 is nonrotatably fitted on the first rotating shaft 43.

As shown in FIG. 3, the speed reduction mechanism 29 includes the sun gear 67 which is nonrotatably fitted on the first rotating shaft 43, and a plurality of planetary gears 71 which are disposed between the second set plate 57 and the sun gear 67 and mesh with the sun gear 67 and internal teeth 67 formed in the second set plate 57. The planetary gears 71 are rotatably supported on the carrier 51 via support shafts 73, and the carrier 51 is rotatably supported between the set frames 13 and 57 by bearings 75 and 77.

A drive gear 79 of the power transmission mechanism 17 is nonrotatably fitted on the carrier 51.

As shown in FIGS. 1 and 4, the power transmission mechanism 17 includes the previously-mentioned spool shaft drive gear 19, the drive gear 79, and a large gear 81 which is disposed between and mesh with the spool shaft drive gear 19 and the drive gear 79. As shown in FIG. 3, the large gear 81 is rotatably supported by a bearing 85 on a cylindrical support section 83 provided in the first set plate 13, and an outer ring 89 of a one-way clutch 87 which is supported on the second set plate 57 is nonrotatably fitted in the inner periphery of a cylindrical section 86 provided at the center of the large gear 81. During the winding operation of the handle 23, the rotation of the large gear 81 is inhibited by the engagement action of the one-way clutch 87, and owing to the resultant reaction force, the drive force of the handle 23 is transmitted to the spool 11 through a speed reduction mechanism 91 which will be described later.

As shown in FIG. 1, the spool shaft 9 extends through the center of the spool 11 and projects into the side plate 7 at the other end, and the second speed reduction mechanism (power transmission mechanism) 91 which transmits the operation torque of the handle 23 to the spool 11 is fitted on the projecting end of the spool shaft 9.

Similarly to the conventional case, this speed reduction mechanism 91 includes a sun gear 93 secured to the projecting end of the spool shaft 9, a plurality of planetary gears 95 which mesh with the sun gear 93, and an internal gear 97 formed at the projecting end of the spool 11, and the planetary gears 95 mesh with the internal gear 97.

The planetary gears 95 are secured to a carrier 101 by a support shaft 99, and the carrier 101 is fitted in a bracket 103 secured to the spool 11 and is rotatably supported on the spool shaft 9 by a bearing 105.

In FIG. 1, reference numeral 23 denotes the previously-mentioned handle for fishing-line winding operation. The handle 23 is connected to the end of a handle shaft 107 that projects outwardly from the side plate 7, and the handle shaft 107 is rotatably fitted in the side plate 7. On the inside of the side plate 7, a ratchet 109 is fixed to the handle shaft 107, and a drive gear 111 is rotatably fitted on the handle shaft 107. The drive gear 111 and the handle shaft 107 are frictionally connected to each other by a well known drag device 113 which is fitted on the handle shaft 107, and the drag force of the drag device 113 can be adjusted by the operation of a drag force adjustment lever 115.

As described previously, during the winding operation of the handle 23, the rotation of the large gear 81 which meshes with the spool shaft drive gear 19 is inhibited by the engagement action of the one-way clutch 87, so that the torque of the handle 23 is transmitted to the spool 11 through the speed reduction mechanism 91 on the side of the spool motor 21 and the spool 11 is rotated in the winding direction.

Although not shown, an engagement claw which is urged by a well known spring (not shown) is engaged with the ratchet 109 so that the reverse rotation of the spool 11 can be prevented by the engagement of the engagement claw with the ratchet 109.

An electrically-powered reel 116 according to the first embodiment has, in addition to the above-mentioned mechanical speed change unit 27, an electrical speed change unit similar to that used in the electrically-powered reel disclosed in Patent Document 1, and as shown in FIGS. 1 and 2, a lever-shaped motor output adjustment member (hereinafter referred to as the "power lever") 117 is secured to the front side of a side section of the side plate 7 on the same side as the handle 23 so that the power lever 117 can be rotationally operated in the same direction as the handle 23.

The power lever 117 is connected to an operation shaft 121 of a potentiometer 119 fitted in the side plate 7, and the variation of the resistance value of the potentiometer 119 due to the rotational operation of the power lever 117 is inputted to a microcomputer fitted in a control box 123 in the top section of the reel body 3. The microcomputer performs variable control of the time rate of drive current energization of the spool motor 21 as the duty ratio of pulse signals corresponding to the operation amount of the power lever 117, thereby performing adjustment to continuously increase or decrease the motor output of the spool motor 21 between a motor stop state and a high output value. In the first embodiment, the mechanical speed change unit 27 is switched between a low speed state based on the low-speed-driving speed reduction gear mechanism 35 and a high speed state based on the high-speed-driving speed reduction gear mechanism 39, by the operation of the power lever 117.

Namely, as shown in FIG. 2, the power lever 117 is secured to the front side of the side section of the side plate 7 so that the power lever 117 can be rotationally operated within an operation angle of 120° between a motor stop position A and a maximum operation position B. When the power lever 117 is located at the motor stop position A as shown by solid lines, the spool motor 21 is placed in a stop state.

When the power lever 117 reaches an intermediate rotational operation position C by being rotationally operated by 60° from the motor stop position A toward the front of the reel body 3 (toward the maximum operation position B), the mechanical speed change unit 27 switches from the low speed state to the high speed state. In the first-half rotational operation range preceding the intermediate rotational operation position C, i.e., in the operation range between A and C in FIG. 2 (hereinafter referred to as the "low speed range"), the microcomputer drives and controls the spool motor 21 at a duty ratio of, for example, 0 to 100% according to the operation amount of the power lever 117 so as to perform adjustment to increase or decrease the motor output, and also drives the spool motor 21 in the forward direction in order to transmit the torque of the spool motor 21 to the spool 11 in the low-speed state via the low-speed-driving speed reduction gear mechanism 35.

Accordingly, when the spool motor 21 rotates in the forward direction in this manner, the low-speed-driving gear 37 and the high-speed-driving gear 41 which mesh with the pinion 33 rotate in the reverse direction as shown in FIGS. 4 and 5 by the construction of the previously-mentioned mechanical speed change unit 27, but only the one-way clutch 45 transmits the rotation of the low-speed-driving gear 37 to the first rotating shaft 43. Accordingly, the first rotating shaft 43 rotates at a speed slower than the high speed state shown in FIG. 6 together with the low-speed-driving gear 37 in accordance with the rotational speed of the motor shaft 31 and the gear ratio of the pinion 33 to the low-speed-driving gear 37, and the torque of the spool motor 21 is transmitted from the first rotating shaft 43 to the sun gear 67 of the first speed reduction mechanism 29 and is then transmitted from the first speed reduction mechanism 29 to the spool shaft 9 via the power transmission mechanism 17.

Accordingly, in this low speed range, the torque of the spool motor 21 which is driven and controlled by the operation of the power lever 117 is transmitted to the spool 11 via the low-speed-driving speed reduction gear mechanism 35.

The potentiometer 119 has an angle sensor (not shown) which detects the rotation angle of the operation shaft 121 based on the operation amount of the power lever 117, and the detection signal of the angle sensor is inputted to the microcomputer.

Then, when the microcomputer determines on the basis of the detection signal of the angle sensor that the operation angle of the power lever 117 has entered beyond 60° the second-half rotational operation range succeeding the intermediate rotational operation position C, i.e., the operation range between C and B in FIG. 2 (hereinafter referred to as the "high speed range"), the microcomputer drives and controls the spool motor 21 at a duty ratio of, for example, 50 to 100% according to the operation amount of the power lever 117 so as to perform adjustment to increase or decrease the motor output, and also temporarily stops the forward rotation of the spool motor 21 and again drives the spool motor 21 in the reverse direction in order to transmit the torque of the spool motor 21 to the spool 11 in the high speed state via the high-speed-driving speed reduction gear mechanism 39.

Accordingly, when the spool motor 21 rotates in the reverse direction in this manner, the low-speed-driving gear 37 and the high-speed-driving gear 41 which mesh with the pinion 33 rotate in the forward direction as shown in FIG. 6, and the rotation of the high-speed-driving gear 41 is transmitted to the second rotating shaft 47 by the engagement action of the one-way clutch 49 of the high-speed-driving speed reduction gear mechanism 39. Then, the one-way clutch 45 of the low-speed-driving speed reduction gear mechanism 35 does not transmit the rotation of the low-speed-driving gear 37 to the first rotating shaft 43, and the second rotating shaft 47 rotates in the forward direction together with the high-speed-driving gear 41 at a rotational speed which corresponds to the rotational speed of the motor shaft 31 and the gear ratio of the pinion 33 to the high-speed-driving gear 41.

When the second rotating shaft 47 rotates in the forward direction in this manner, the large gear 65 which is nonrotatably fitted on the second rotating shaft 47 rotates in the forward direction, and the small gear 63 which meshes with the large gear 65 rotates in the reverse direction. Accordingly, the first rotating shaft 43 on which the small gear 63 is nonrotatably fitted rotates in the reverse direction, and at this time, the rotational speed of the second rotating shaft 47 is amplified by an amount corresponding to the gear ratio of the large gear 65 to the small gear 63, and the amplified rotational speed is transmitted from the small gear 63 to the first rotating shaft 43.

Accordingly, the first rotating shaft 43 rotates at a speed slower than the low speed state, and the amplified torque of the spool motor 21 is transmitted from the first rotating shaft 43 to the sun gear 67 of the first speed reduction mechanism 29 and is then transmitted from the first speed reduction mechanism 29 to the spool shaft 9 via the power transmission mechanism 17.

Figure 7:
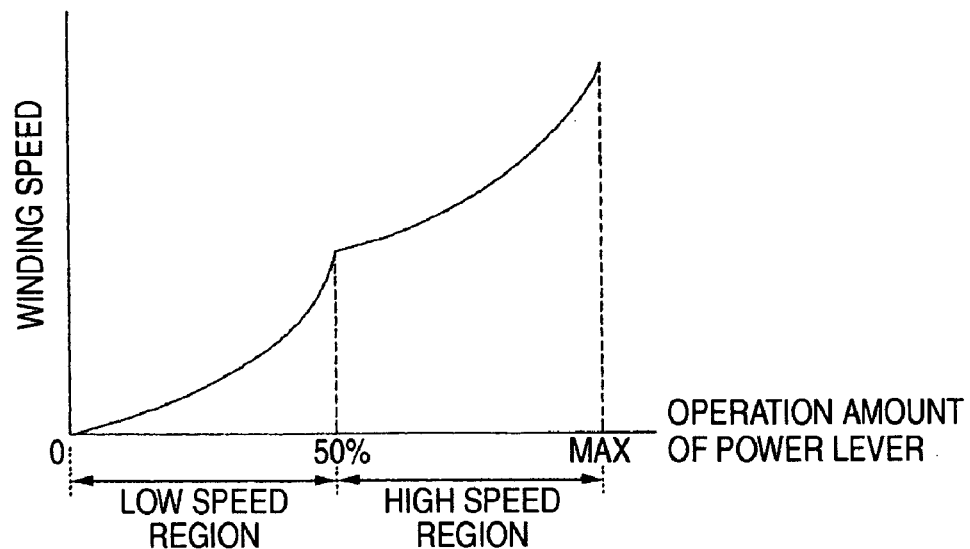
FIG. 7 is a graph showing a variation in winding speed corresponding to the operation amount of a power lever.

Accordingly, in this high speed range, the torque of the spool motor 21 which is driven and controlled by the operation of the power lever 117 is transmitted to the spool 11 via the high-speed-driving speed reduction gear mechanism 39. FIG. 7 shows the winding speed of the fishing line which corresponds to the operation amount of the power lever 117 in the previously-mentioned high-speed and low speed ranges. As shown in FIG. 7, even if the spool motor 21 drives at a duty ratio of 100% in the low speed range, the winding speed is slow compared to the high speed range because of the structure in which the torque of the spool motor 21 is transmitted to the spool 11 via the low-speed-driving speed reduction gear mechanism 35.

As shown in FIGS. 1 and 2, a clutch lever 127 for operating a well known clutch mechanism 125 fitted in the side plate 7 is secured to the rear side of the side section of the side plate 7 so that the clutch lever 127 can be pressed downwardly, and the clutch mechanism 125 is switched from clutch-on to clutch-off by the pressing of the clutch lever 127.

When the handle 23 is rotated in the winding direction during the clutch-off state, the clutch mechanism 125 is restored to the clutch-on state via a well known restoration mechanism which is not shown. The spool 11 is switched between a fishing-line winding state and a fishing-line feeding state by the clutch-on/off switching operation of the clutch lever 127, whereby the torque of the spool motor 21 or the handle 23 is transmitted to or disconnected from the spool 11.

In FIG. 1, reference numeral 129 denotes a rotation detecting unit which detects the rotational speed and the rotating direction of the spool 11. The rotation detecting unit 129 includes a pair of reed switches 131 fitted on the first set plate 13 and a plurality of magnets 133 fixed to a peripheral section of one end side of the spool 11 in opposition to the pair of reed switches 131. The reed switches 131 are connected to the CPU of the microcomputer.

Similarly to a line length measurement program disclosed in JP-A-5-103567, the CPU loads a decision signal indicative of the forward or reverse rotation of the spool 11, which is outputted from the reed switches 131, and determines whether the fishing line is being fed forward or wound. In addition, the CPU counts the rotation pulse signals of the spool 11 which are loaded from the reed switches 131, and executes an arithmetic operation on a line length calculation formula stored in a ROM of the microcomputer, on the basis of the count value.

Then, the CPU displays the arithmetic result (line length) on a display 137 which is disposed on an operation panel 135 of the control box 123, and a fisherman, while confirming the display, can feed a lure to a predetermined water depth or wind the fishing line by operating the handle 23 or the power lever 117.

Furthermore, as shown in FIG. 1, a reset switch 141 and a swimming-depth memory switch 143 are respectively fitted at upper and lower positions on the operation panel 135 adjacently to the display 137, and are connected to the microcomputer.

Figure 8:
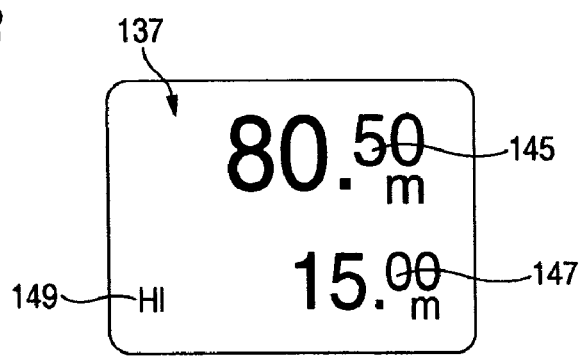
FIG. 8 is an explanatory view of a display state of a display.

The swimming-depth memory switch 143 is used for setting a swimming depth position. As mentioned previously, during the feeding or winding of the fishing line, the CPU finds a line length on the basis of the rotation pulse signals of the spool 11 which are loaded to the CPU from the reed switches 131, and displays the line length on the display 137. As shown in FIG. 8, in the display 137, a water-depth display section 145 and a swimming-depth display section 147 display the depth of the lure from the water surface and the distance of the lure from a swimming depth in the form of two upper and lower parallel large-sized images, respectively.

During actual fishing, when the fishing line is fed to the water surface from the rod tip and the fisherman operates the reset switch 141, the display value of the water-depth display section 145 is reset to "0.0".

After that, as the fisherman feeds the fishing line forward, the line length value calculated and measured by the CPU with the rotation of the spool 11 is displayed on the water-depth display section 145. When the fishing line is fed forward by, for example, 95.5 m and the fisherman operates the swimming-depth memory switch 143, "0.0" is displayed on the swimming-depth display section 147 and a swimming depth position is set. After that, as shown in FIG. 9, the distance of the lure and the feed amount (water depth) from the water surface at the time of the winding of the fishing line by, for example, 15 m from the swimming depth position are respectively displayed on the swimming-depth display section 147 and the water-depth display section 145.

Figure 9:
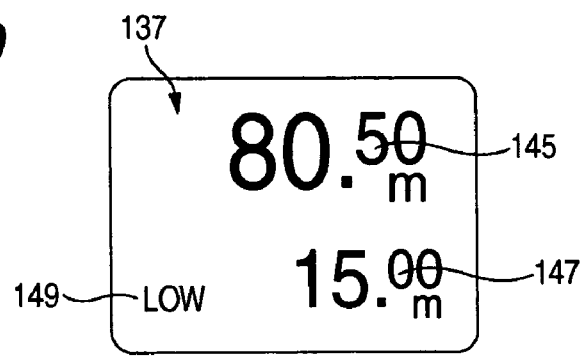
FIG. 9 is an explanatory view of a display state of a display.

As shown in FIGS. 8 and 9, a HI/LOW display section 149 is provided at the bottom left of the display 137, and the switching of the mechanical speed change unit 27 between the high speed state and the low speed state by the power lever 117 is displayed on the HI/LOW display section 149 by the signs "HI" and "LOW".

Since the electrically-powered reel 116 according to the first embodiment is constructed in this manner, the fishing line is fed forward from the spool 11 by the clutch-off operation of the clutch lever 127 or is wound on the spool 11 by the winding drive of the spool motor 21 by the power lever 117 or by the winding operation of the handle 23. During the feed or winding of the fishing line, the line length is measured on the basis of the detected value of the rotation detecting unit 129 and is displayed on the display 137. The mechanical speed change unit 27 is switched between the low speed state based on the low-speed-driving speed reduction gear mechanism 35 and the high speed state based on the high-speed-driving speed reduction gear mechanism 39, by the low speed range/high speed range switching operation of the power lever 117 shown in FIG. 2.

In the low speed range, the microcomputer drives the spool motor 21 in the forward direction as shown in FIGS. 4 and 5, and transmits the torque of the spool motor 21 to the first speed reduction mechanism 29, the power transmission mechanism 17, the spool shaft 9 and the speed reduction mechanism 91 via the low-speed-driving speed reduction gear mechanism 35 while performing adjustment to increase or decrease the motor output within the range of duty ratios of 0 to 100% which corresponds to the operation of the power lever 117, thereby rotating the spool 11.

In addition, the angle sensor detects the rotation angle of the operation shaft 121 corresponding to the operation amount of the power lever 117, and when the microcomputer determines on the basis of the detection signal of the angle sensor that the operation angle of the power lever 117 has entered the high speed range of FIG. 2 beyond 60°, the microcomputer temporarily stops the forward rotation of the spool motor 21 and again drives the spool motor 21 in the reverse direction, and transmits the torque of the spool motor 21 to the first speed reduction mechanism 29, the power transmission mechanism 17, the spool shaft 9 and the speed reduction mechanism 91 while performing adjustment to increase or decrease the motor output within the range of duty ratios of 50 to 100% which corresponds to the operation of the power lever 117, thereby rotating the spool 11.

Then, as shown in FIGS. 8 and 9, the switching of the mechanical speed change unit 27 between the high speed state and the low speed state by the power lever 117 is displayed on the HI/LOW display section 149 by the signs "HI" and "LOW".

According to the first embodiment, it is possible to switch the mechanical speed change unit 27 between the high speed state and the low speed state by the operation of the power lever 117 within the rotational operation range thereof while adjusting the motor output of the spool motor 21 by the rotational operation of the power lever 117. Accordingly, the fisherman can perform both mechanical speed change operation and electrical speed change operation without any special consciousness by the rotational operation of one power lever 117, so that the fisherman can perform rapid and appropriate speed change operation with respect to the movement of a fish during the winding of the fishing line at the winding speed and can avoid troubles such as accidental fish escape.

Although in the above-mentioned first embodiment the rotational operation amount of the power lever 117 is detected by the angle sensor, other methods may also be adopted. For example, a magnet may be fitted on the power lever 117 and a reed switch which is turned on by the magnet may be fitted at the intermediate rotational operation position C on the side plate 7 so that each time the power lever 117 passes through the intermediate rotational operation position C, the reed switch is turned on and the microcomputer receives the signal from the reed switch and alternately switches the mechanical speed change unit 27 between the low speed state and the high speed state.

Second Embodiment

Figure 10:
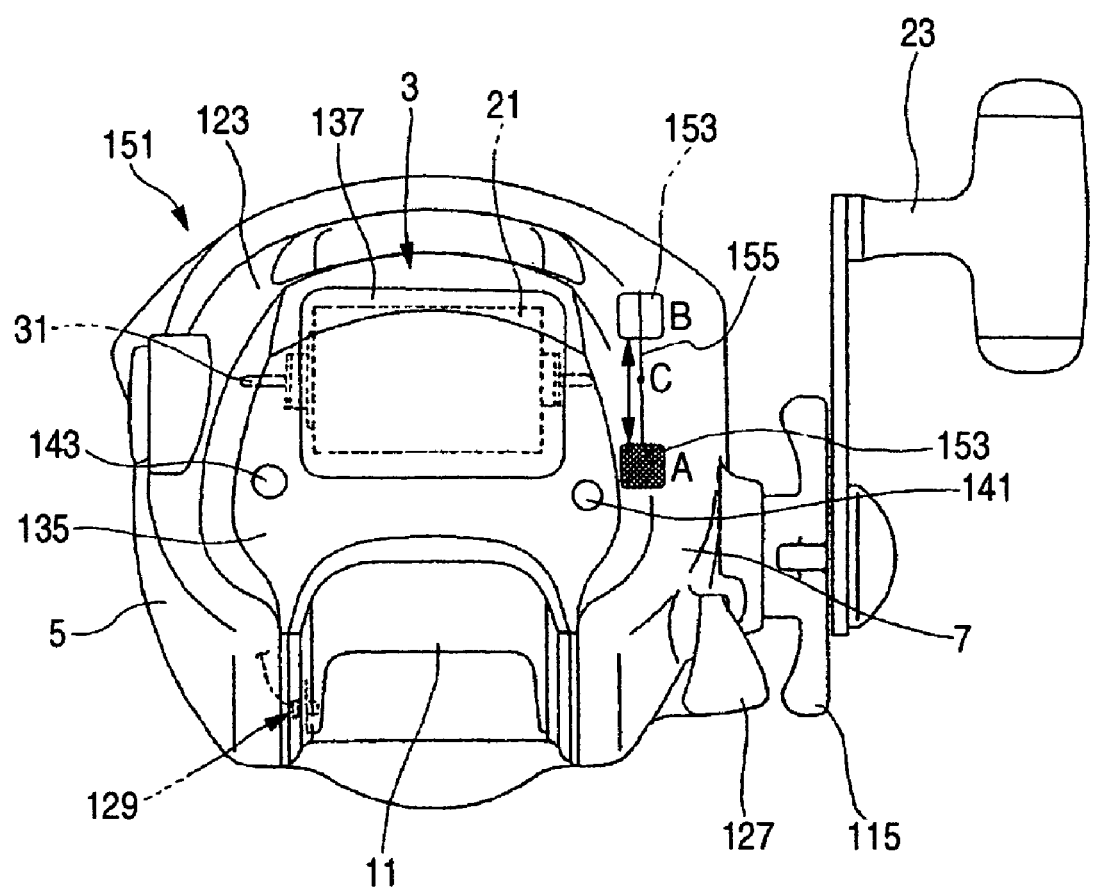
FIG. 10 is a plan view of an electrically-power reel according to a second embodiment.

FIG. 10 shows an electrically-powered reel 151 according to a second embodiment as in claims 1 and 2. In the second embodiment, a slide switch is used as a motor output adjustment member in place of the above-mentioned power lever 117. Although the second embodiment of the invention will be described below with reference to the FIG. 10, the same reference numerals are used to denote the same constituent elements as those used in the first embodiment, and the description of the same constituent elements is omitted herein.

As shown in FIG. 10, a power switch 153 is fitted on the top section of the side plate 7 adjacently to the display 137 for sliding movement along a guide slit 155 in the forward and rearward directions of the reel body 3 between the motor stop position A and the maximum operation position B.

Similarly to the case of the first embodiment, the second embodiment is constructed so that when the power switch 153 is slid by half from the motor stop position A to the intermediate rotational operation position C in the forward direction of the reel body 3 (toward the maximum operation position B), the mechanical speed change unit 27 is switched from the low speed state to the high speed state. In the first-half slide operation range preceding the intermediate rotational operation position C, i.e., in the low speed range (first-half movement operation range) between A and C in FIG. 10, the microcomputer drives and controls the spool motor 21 at a duty ratio of 0 to 100% according to the slide operation amount of the power switch 153 so as to perform adjustment to increase or decrease the motor output, and also drives the spool motor 21 in the forward direction in order to transmit the torque of the spool motor 21 to the spool 11 via the low-speed-driving speed reduction gear mechanism 35.

A position sensor (not shown) is fitted in the guide slit 155 at the intermediate rotational operation position C, and the detection signal of the position sensor is inputted to the microcomputer.

Similarly to the case of the first embodiment, when the microcomputer determines on the basis of the detection signal of the position sensor that the power switch 153 has been operated to enter the second-half slide operation range preceding the intermediate rotational operation position C, i.e., the high speed range between C and B (the second-half movement operation range) in FIG. 10, the microcomputer drives and controls the spool motor 21 at a duty ratio of, for example, 50 to 100% according to the slide operation amount of the power switch 153 so as to perform adjustment to increase or decrease the motor output, and also temporarily stops the forward rotation of the spool motor 21 and again drives the spool motor 21 in the reverse direction in order to transmit the torque of the spool motor 21 to the spool 11 in the high speed state via the high-speed-driving speed reduction gear mechanism 39.

Accordingly, similarly to the case of the first embodiment, in the low speed range, the torque of the spool motor 21 which is driven and controlled by the slide operation of the power lever 153 is transmitted to the spool 11 via the low-speed-driving speed reduction gear mechanism 35, whereas in the high speed range, the torque of the spool motor 21 which is driven and controlled by the slide operation of the power lever 153 is transmitted to the spool 11 via the high-speed-driving speed reduction gear mechanism 39.

Accordingly, according to the second embodiment as well, it is possible to switch the mechanical speed change unit 27 between the high speed state and the low speed state by the slide operation of the power switch 153 within the rotational operation range thereof while adjusting the motor output of the spool motor 21 by the slide operation of the 153. Accordingly, the fisherman can perform both mechanical speed change operation and electrical speed change operation by the slide operation of one power switch 153, so that the fisherman can perform rapid and appropriate speed change operation with respect to the movement of a fish during the winding of the fishing line at the winding speed and can avoid troubles such as accidental fish escape.

Third Embodiment

Figure 11:
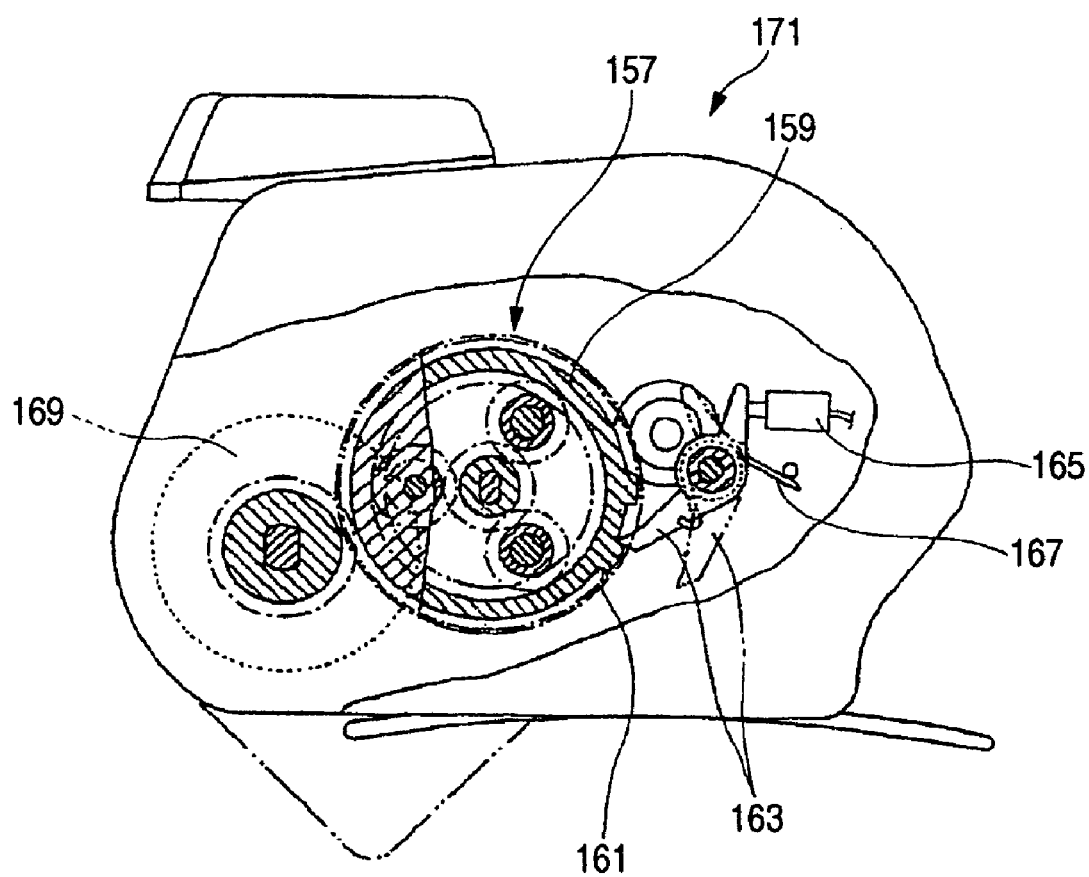
FIG. 11 is a partial cross-sectional view of an electrically-power reel according to a third embodiment.

FIG. 11 shows an electrically-powered reel 171 according to a third embodiment as in claims 1 and 2. Japanese Patent No. 3,159,637 discloses an electrically-powered reel which includes, in addition to an electrical speed change unit using a power lever, a mechanical speed change unit which mechanically switches the rotational speed of a spool between a high speed state and a low speed state by turning on/off a part of a drive system of a speed reduction mechanism which reduces the rotational speed of a spool motor, so as to change the ratio of gear mesh, by the operation of a switching member (a manual external operation member). In the third embodiment, instead of the switching member, a speed change switching stopper 163 which is engaged with a ratchet gear 161 formed around the outer periphery of an internal gear 159 as shown in FIG. 11 is operated through the drive and control of a solenoid 165 by the microcomputer. The speed change switching stopper 163 is normally urged in a direction in which to engage with the ratchet gear 161, by the spring force of a torsion spring 167.

When the torque of the spool motor 169 is to be transmitted to the spool in the low speed state, the microcomputer energizes the solenoid 165 and rotates the speed change switching stopper 163 against the spring force in the counterclockwise direction by the solenoid 165 as shown by dot-dot-dashed lines, thereby separating the speed change switching stopper 163 from the ratchet gear 161 so as to place the internal gear 159 into a free state.

On the other hand, when the torque of the spool motor 169 is to be transmitted to the spool in the high speed state, the microcomputer deenergizes the solenoid 165, and when the solenoid 165 is deenergized, the speed change switching stopper 163 engages with the ratchet gear 161 by the spring force of the torsion spring 167 and stops the rotation of the internal gear 159, thereby switching the speed reduction mechanism 157 to the high speed state.

The other mechanism structures are similar to those of the electrically-powered reel of Patent No. 3,159,637, and the description of those structures is omitted herein.

Similarly to the case of the first embodiment shown in FIG. 1, in the electrically-powered reel 171 according to the third embodiment, the speed reduction mechanism 157 is switched between the above-mentioned low speed state and high speed state by the operation of a power lever (not shown) within the rotational operation range thereof, and the motor output is placed under duty control according to the operation of the power level in each of the low speed range and the high speed range of the power lever similarly to the case of the first embodiment.

Accordingly, in the third embodiment as well, similarly to the case of the first embodiment shown in FIG. 1, since both mechanical speed change operation and electrical speed change operation can be performed by the rotational operation of one power lever, the predetermined object can be achieved. A fisherman can perform rapid and appropriate speed change operation with respect to the movement of a fish and can avoid troubles such as accidental fish escape.

Incidentally, the conditions of an output adjustment range or a speed change position during the operation of the power lever 117 or the power switch 153 in the low speed state or the high speed state are approximately set in terms of the setting of the gear ratio of the low-speed-driving speed reduction gear mechanism 35 to the high-speed-driving speed reduction gear mechanism 39, motor characteristics, reel sizes, power settings and the like. For example, the conditions may be set to a duty ratio of 0 to 90% in the low speed state and to a duty ratio of 40 to 100% in the high speed state, or the speed change operation angle of the power lever 117 may be set to 40°, and various other condition settings are possible.

Fourth Embodiment

Figure 12:
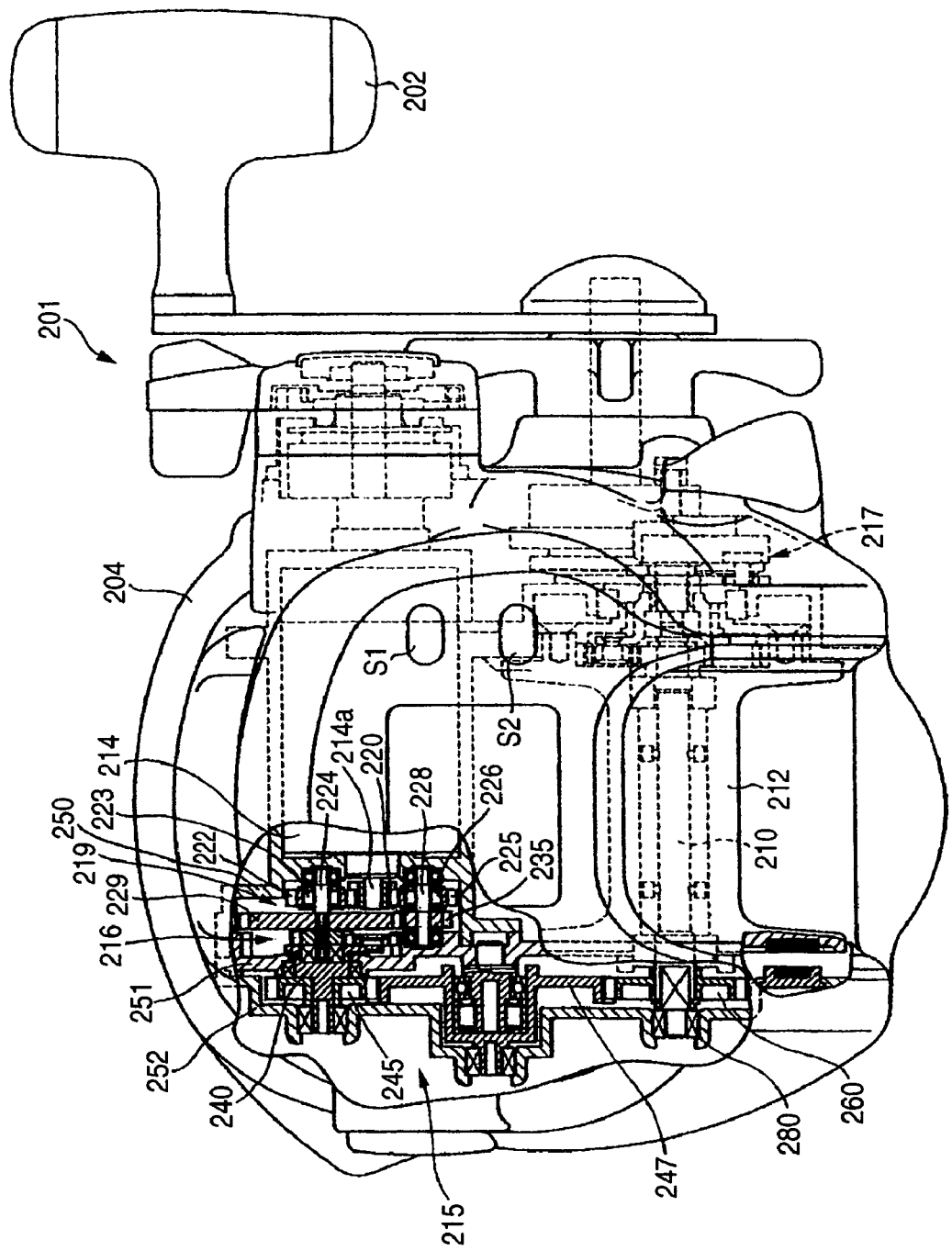
FIG. 12 is a partially cross-sectional plan view of a fourth embodiment of an electrically-powered fishing reel according to the invention, showing a section in which a speed change unit is disposed.
Figure 13:
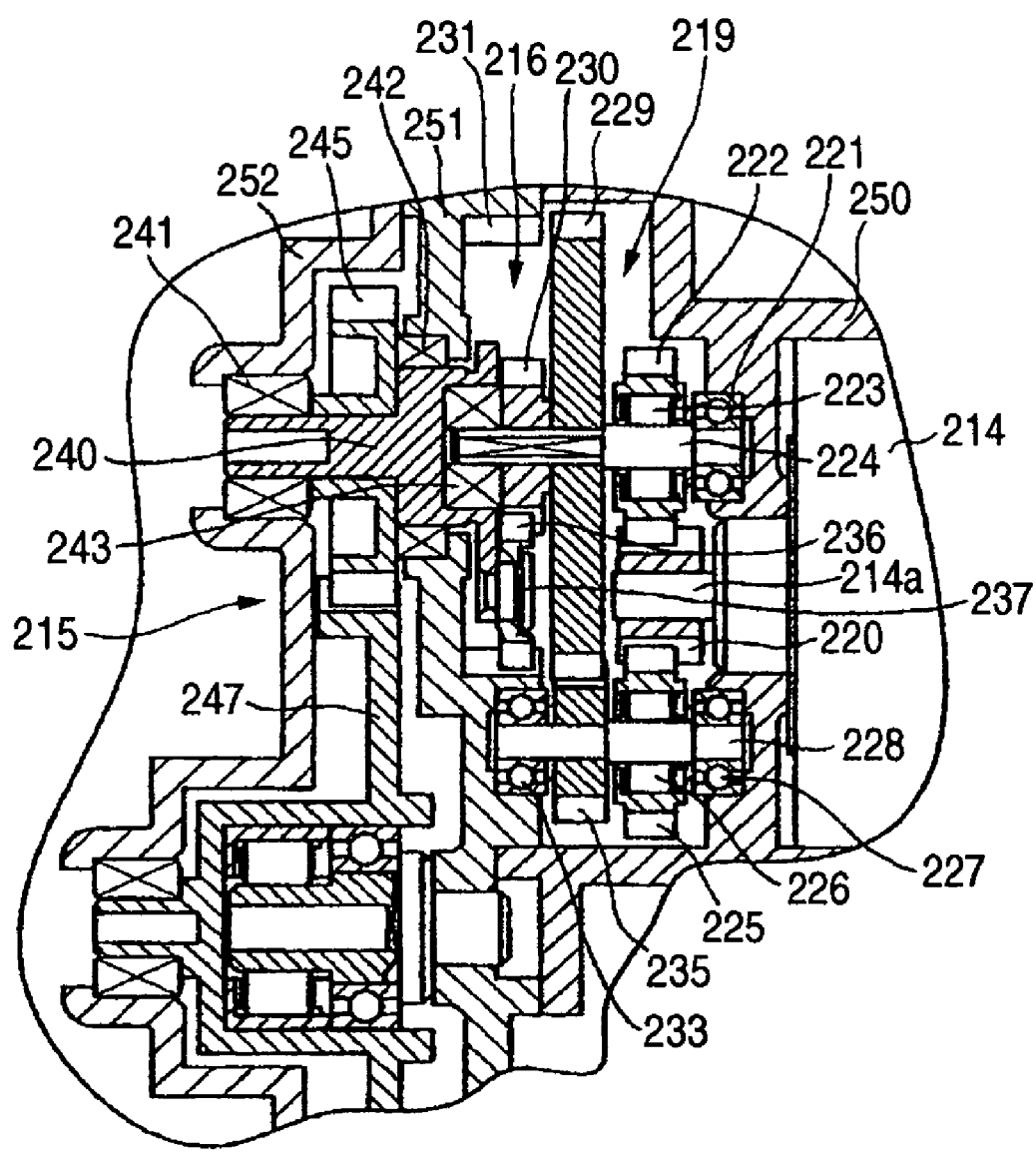
FIG. 13 is a magnified view of a speed change unit section.
Figure 14:
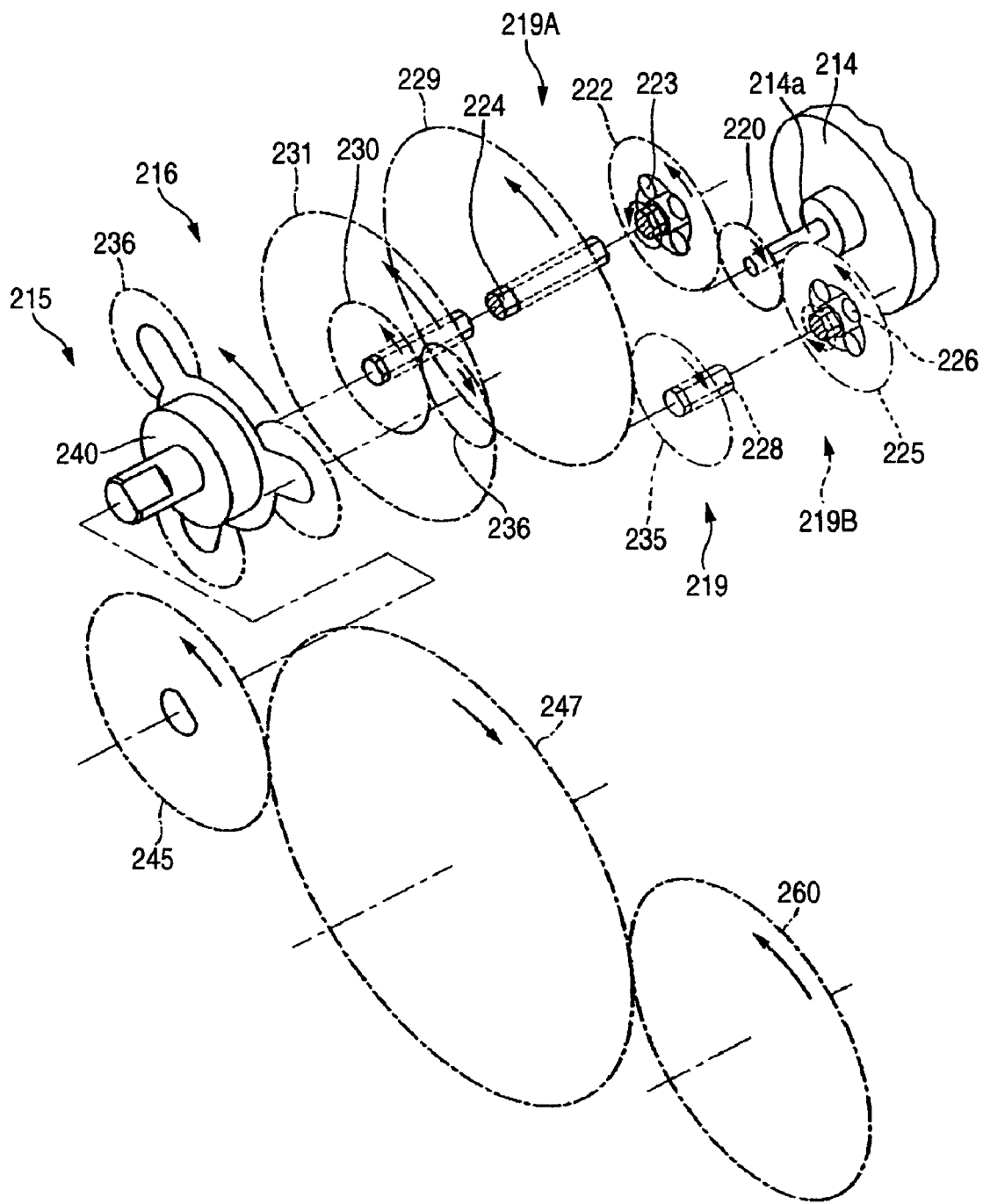
FIG. 14 is a schematic view for explaining a power transmission path in a high-speed-driving gear transmission mechanism.
Figure 15:
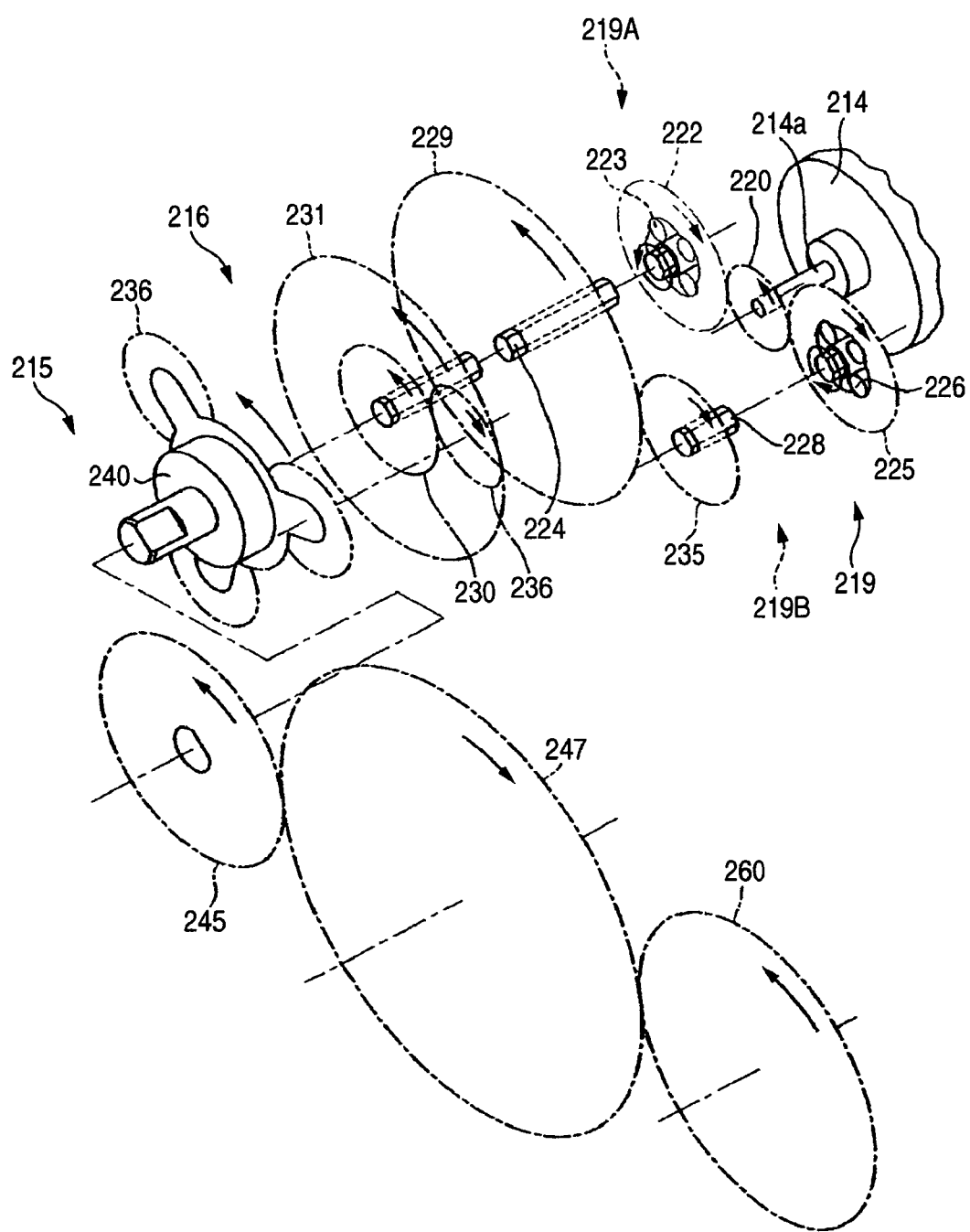
FIG. 15 is a schematic view for explaining a power transmission path in a low-speed-driving gear transmission mechanism.

FIGS. 12 to 15 show an electrically-powered fishing reel according to a fourth embodiment of the invention. FIG. 12 is a partially cross-sectional plan view of a section in which a speed change unit is disposed. FIG. 13 is a magnified view of a speed change unit section. FIG. 14 is a schematic view for explaining a power transmission path in a high-speed-driving gear transmission mechanism. FIG. 15 is a schematic view for explaining a power transmission path in a low-speed-driving gear transmission mechanism.

An electrically-powered fishing reel 201 according to a fourth embodiment of the invention includes a reel body 204 to which a manual handle 202 is fitted. A spool shaft 210 is rotatably supported between right and left frames which constitute the reel body 204 by a bearing 280, and a spool 212 is disposed to surround this spool shaft 210.

A forward/reverse spool driving motor (hereinafter referred to as the motor) 214 is held between the right and the left frames of the reel body 204. The torque of the rotating drive shaft (output section) 214a of this motor 214 is transmitted to the spool 212 via a speed change unit 219 and a power transmission mechanism 215.

The power transmission mechanism 215 is disposed on the right-frame side and the left-frame side of the reel body 204, and a first speed reduction mechanism 216 which includes a power transmitting gear train (a drive gear 245, an intermediate gear 247 and a spool drive gear 260) and planetary gears for reducing the rotational drive force of the motor 214 is disposed on the left-frame side, while a second speed reduction mechanism 217 including planetary gears is disposed on the fight-frame side. In this case, as shown in FIG. 12, the first speed reduction mechanism 216 is disposed on the left-frame side, and the second speed reduction mechanism 217 is disposed on the fight-frame side, but both mechanisms 216 and 217 may be also constructed to be collectively disposed on either one of the first- and second-frame sides.

The spool drive gear 260 is nonrotatably fitted on one end of the spool shaft 210, and the rotational drive force reduced by the first speed reduction mechanism 216 and inputted to the drive gear 245 is transmitted to the spool shaft 210 via the intermediate gear 247. Then, the rotational drive force transmitted to the spool shaft 210 is further reduced through the second speed reduction mechanism 217, and the resultant rotational drive force is transmitted to the spool 212.

High-speed rotational drive force or low-speed rotational drive force is inputted to the drive gear 245 by the speed change unit 219 which will be described below, and when either drive force is inputted to the drive gear 245, the drive gear 245 is rotationally driven in the counterclockwise direction as viewed from the left side of FIG. 12, as shown in FIGS. 14 and 15. The direction of this rotation of the drive gear 245 is selected so that the spool 212 rotates in the direction in which a fishing line is to be wound on the spool 212.

The construction of the above-mentioned speed change unit 19 will be described below.

As shown in FIGS. 14 and 15, the speed change unit 219 includes a high-speed-driving gear transmission mechanism 219A and a low-speed-driving gear transmission mechanism 219B which are disposed between the rotating drive shaft (output section) 214a of the motor 214 and the power transmission mechanism 215 and receive power transmitted from a pinion gear 220 which is nonrotatably fitted on the rotating drive shaft 214a of the motor 214, in order to transmit the rotation of the rotating drive shaft 214a of the motor 214 to the spool 212 as high speed rotation or low speed rotation.

The board high-speed-driving gear transmission mechanism 219A includes a high-speed-driving input gear 222 which meshes with the pinion gear 220, a first rotating shaft 224 which supports this high-speed-driving input gear 222 for rotation about its axis, and a large-diameter gear (high-speed-driving output gear) 229 fixed to this first rotating shaft 224. A first one-way clutch 223 is interposed between the first rotating shaft 224 and the high-speed-driving input gear 222.

The low-speed-driving gear transmission mechanism 219B includes a low-speed-driving input gear 225 which meshes with the pinion gear 220, a second rotating shaft 228 which supports this low-speed-driving input gear 225 for rotation about its axis, and a small-diameter gear (low-speed-driving output gear) 235 fixed to this second rotating shaft 228. A second one-way clutch 226 is interposed between the second rotating shaft 228 and the low-speed-driving input gear 225.

The outside diameter of the high-speed-driving input gear 222 and the outside diameter of the low-speed-driving input gear 225 are set to be the same (the gear ratio of the high-speed-driving input gear 222 to the pinion gear 220 and the gear ratio of the low-speed-driving input gear 225 to the pinion gear 220 are set to be the same.) (Of course, both may not be the same.) The first one-way clutch 223 and the second one-way clutch 226 are constructed so that their rotating directions to transmit power are set opposite to each other.

Namely, when the high-speed-driving input gear 222 is rotationally driven in the counterclockwise direction as shown in FIG. 14 (the counterclockwise and clockwise directions as viewed in FIGS. 14 and 15 are hereinafter referred to as the "reverse direction" and the "forward direction", respectively), the first one-way clutch 223 transmits the torque of the high-speed-driving input gear 222 to the first rotating shaft 224, whereas when the high-speed-driving input gear 222 is rotationally driven in the forward direction as shown in FIG. 15, the first one-way clutch 223 does not transmit the torque of the high-speed-driving input gear 222 to the first rotating shaft 224. On the other hand, when the low-speed-driving input gear 225 is rotationally driven in the forward direction as shown in FIG. 15, the second one-way clutch 226 transmits the torque of the low-speed-driving input gear 225 to the second rotating shaft 228, whereas when the low-speed-driving input gear 225 is rotationally driven in the reverse direction as shown in FIG. 14, the second one-way clutch 226 does not transmit the torque of the low-speed-driving input gear 225 to the second rotating shaft 228.

The first rotating shaft 224 is rotatably supported by bearings 221 and 243 between a first frame 250 of the reel body 204 and a carrier 240 which will be described later. The second rotating shaft 228 is rotatably supported by bearings 227 and 233 between the first frame 250 and a second frame 251 of the reel body 204.

The large-diameter gear (high-speed-driving output gear) 229 of the high-speed-driving gear transmission mechanism 219A and the small-diameter gear (low-speed-driving output gear) 235 of the low-speed-driving gear transmission mechanism 219B mesh with each other, and as will be described later, the rotational drive force of the low-speed-driving output gear 235 rotationally drives the first rotating shaft 224 in the state of being reduced by the high-speed-driving output gear 229. It is to be noted that the rotational drive force of the high-speed-driving output gear 229 is transmitted to the second rotating shaft 228 in the state of being increased by the low-speed-driving output gear 235, but the second rotating shaft 228 is only allowed to idle by the action of the second one-way clutch 226. Namely, during high-speed rotation, power is transmitted with the low-speed-driving output gear 235 omitted.

The gear ratio of the high-speed-driving output gear 229 to the low-speed-driving output gear 235 is set so that the ratio of the rotational speed of the spool 212 in a high-speed mode to the rotational speed of the spool 212 in a low-speed mode becomes a desired value.

The output from either of the high-speed-driving gear transmission mechanism 219A or the low-speed-driving gear transmission mechanism 219B constructed in the above-mentioned manner is outputted from the first rotating shaft 224, and is reduced by the above-mentioned first speed reduction mechanism 216 which constitutes the power transmission mechanism 215. The reduced output is transmitted to the spool 212 side via the power transmission mechanism 215.

The first speed reduction mechanism 216 includes a sun gear 230 which is nonrotatably fitted on the first rotating shaft 224, and a plurality of (in the fourth embodiment, three) planetary gears 236 which are disposed between the second frame 251 and the sun gear 230 and mesh with the sun gear 230 and internal teeth 231 formed in the second frame 251. In this case, the planetary gears 236 are rotatably supported on the carrier 240 via support shafts 237. The carrier 240 is rotatably supported between the second frame 251 and a third frame 252 by bearings 242 and 241. The above-mentioned drive gear 245 is nonrotatably fitted on the carrier 240.

The reel body 204 also includes a high-speed mode switch S1 and a low-speed mode switch S2 as a switching operation member for effecting mode switching for the rotational speed of the spool 212. When the high-speed mode switch S1 is turned on, the rotating drive shaft 214a of the motor 214 is forward-driven as shown in FIG. 14, whereas when the low-speed mode switch S2 is turned on, the rotating drive shaft 214a of the motor 214 is reverse-driven as shown in FIG. 14.

The operation of the electrically-powered fishing reel 201 having the above-mentioned construction will be described below.

High-Speed Mode

First, when the high-speed mode switch S1 is turned on, the rotating drive shaft 214a of the motor 214 is forward-driven as shown in FIG. 14. When the rotating drive shaft 214a is forward-driven, both the high-speed-driving input gear 222 and the low-speed-driving input gear 225 which mesh with the pinion gear 220 rotate in the reverse direction At this time, the first one-way clutch 223 transmits the rotation of the high-speed-driving input gear 222 to the first rotating shaft 224 by the above-mentioned action, but the second one-way clutch 226 does not transmit the rotation of the low-speed-driving input gear 225 to the second rotating shaft 228. Accordingly, the first rotating shaft 224 is rotationally driven in the reverse direction at a rotational speed which corresponds to the rotational speed of the rotating drive shaft 214a and the gear ratio of the pinion gear 220 to the high-speed-driving input gear 222. In this case, the gear ratio is set to a gear ratio which permits drive force to be transmitted between the pinion gear 220 and the high-speed-driving input gear 222 without being increased.

When the first rotating shaft 224 is reverse-driven, the high-speed-driving output gear 229 which is nonrotatably fitted on the first rotating shaft 224 also rotates in the reverse direction, and the low-speed-driving output gear 235 which meshes with this high-speed-driving output gear 229 and the second rotating shaft 228 nonrotatably fitted on this low-speed-driving output gear 235 rotate in the forward direction. In this case, the rotating direction of the second rotating shaft 228 and the rotating direction of the low-speed-driving input gear 225 become opposite to each other, but since the second one-way clutch 226 is interposed between the second rotating shaft 228 and the low-speed-driving input gear 225, the low-speed-driving input gear 225 and the second rotating shaft 228 are brought into their idling states (the high-speed-driving gear transmission mechanism 219A functions in its power transmitting state, but the low-speed-driving gear transmission mechanism 219B does not function).

Then, when the first rotating shaft 224 rotates in the reverse direction as mentioned above, the sun gear 230 which is nonrotatably fitted on this first rotating shaft 224 rotates in the reverse direction, and the planetary gears 236 which mesh with the sun gear 230 rotate in the forward direction relative to the carrier 240. At this time, since the second frame 251 is fixed, the planetary gears 236 which mesh with the internal teeth 231 formed in the second frame 251 receives reaction force from the internal teeth 231 side while rotating (on its axis) in the forward direction, and at the same time rotates around the sun gear 230 while applying force acting to rotate the carrier 240 in the reverse direction to the carrier 240 which supports the planetary gears 236. Namely, the rotation of the first rotating shaft 224 is transmitted to the carrier 240 while being reduced in rotational speed, and the carrier 240 rotates integrally with the drive gear 245. Namely, the rotational drive force outputted from the motor 214 via the high-speed-driving gear transmission mechanism 219A is outputted to the drive gear 245 while being reduced by the first speed reduction mechanism 216. Then, when the drive gear 245 rotates in the reverse direction, the spool 212 is rotated at a predetermined speed (high speed) in the fishing-line winding direction by the power transmission mechanism 215 (the gears 247, 260 and so on).

Low-Speed Mode

Then, when the low-speed mode switch S2 is turned on, the rotating drive shaft 214a of the motor 214 is reverse-driven as shown in FIG. 15. When the rotating drive shaft 214a is reverse-driven, both the low-speed-driving input gear 225 and the high-speed-driving input gear 222 which mesh with the pinion gear 220 rotate in the reverse direction. At this time, the second one-way clutch 226 transmits the rotation of the low-speed-driving input gear 225 to the second rotating shaft 228 by the above-mentioned action, but the first one-way clutch 223 does not transmit the rotation of the high-speed-driving input gear 222 to the first rotating shaft 224. Accordingly, the second rotating shaft 228 is rotationally driven in the forward direction at a rotational speed which corresponds to the rotational speed of the rotating drive shaft 214a and the gear ratio of the pinion gear 220 to the low-speed-driving input gear 225. In this case, the gear ratio is set to a gear ratio which permits drive force to be transmitted between the pinion gear 220 and the low-speed-driving input gear 225 without being increased.

When the second rotating shaft 228 is forward-driven, the low-speed-driving output gear 235 which is nonrotatably fitted on the second rotating shaft 228 also rotates in the forward direction, and the high-speed-driving output gear 229 which meshes with this low-speed-driving output gear 235 and the first rotating shaft 224 nonrotatably fitted on this high-speed-driving output gear 229 rotate in the reverse direction. In this case, the rotating direction of the first rotating shaft 224 and the rotating direction of the high-speed-driving input gear 222 become opposite to each other, but since the first one-way clutch 223 is interposed between the first rotating shaft 224 and the high-speed-driving input gear 222, the high-speed-driving input gear 222 and the first rotating shaft 224 are brought into their idling states (the low-speed-driving gear transmission mechanism 219B functions in its power transmitting state, but the high-speed-driving gear transmission mechanism 219A does not function). In addition, at this time, the rotation of the low-speed-driving output gear 235 is outputted to the first rotating shaft 224 in the state of being reduced in rotational speed in accordance with the gear ratio of the low-speed-driving output gear 235 to the high-speed-driving output gear 229. Namely, when the motor 214 is reverse-driven, the first rotating shaft 224 is reverse-driven similarly to the case where the motor 214 is forward-driven, and the torque of the motor 214 is outputted to the side of the power transmission mechanism 215 which includes the first speed reduction mechanism 216, in the state of being reduced in rotational speed compared to the high-speed mode. Thus, the spool 212 is rotated in the fishing-line winding direction at a low speed compared to the high-speed mode.

As described above, the electrically-powered fishing reel 1 according to the fourth embodiment of the invention can switch the rotational speed (winding speed) of the spool 12 between the high-speed mode and the low-speed mode merely by performing switching control on the rotating direction of the motor 214 by the above-mentioned speed change unit 219. At this time, in the case of either of the high-speed mode or the low-speed mode, the first rotating shaft 224 which serves as the final output shaft is reverse-driven in a high-speed state or in a low-speed state lower in rotational speed than the high-speed state, within the range of the rotational speed of the motor 214.

0038

In the above-mentioned construction, when the high-speed-driving gear transmission mechanism 219A is selected, the drive gear 245 is rotationally driven without the low-speed-driving output gear 235 of the low-speed-driving gear transmission mechanism 219B inserted in the power transmission path of the high-speed-driving gear transmission mechanism 219A, whereby the drive gear 245 is prevented from undergoing a speed-increasing action due to the gear ratio of the low-speed-driving gear transmission mechanism 219B and can be prevented from rotating at an increased speed exceeding the rotational speed of the motor 214. Accordingly, gear mesh noise due to electrically-powered driving is reduced, whereby comfortable high-speed winding can be realized. In addition, the abrasion of gears and support sections can be prevented.

According to the invention, in the construction which incorporates the speed change unit 219 including the high-speed-driving gear transmission mechanism 219A and the low-speed-driving gear transmission mechanism 219B for effecting switching between the high-speed mode and the low-speed mode by switching the motor 214 between forward driving and reverse driving, the high-speed-driving gear transmission mechanism 219A is constructed to transmit the torque of the motor 214 in one rotational direction to the power transmission mechanism 215 for transmitting power to the spool 212, without increasing the rotational speed of the motor 214, while the low-speed-driving gear transmission mechanism 219B is constructed to transmit the torque of the motor 214 in the other direction to the power transmission mechanism 215 while reducing the rotational speed of the motor 214. In this construction, modifications can be appropriately made as to the manner of arrangement of each of the power transmission paths and the mesh relationship between each of the gears. In other words, the above-mentioned fourth embodiment needs only to has a construction capable of transmitting power without inserting the low-speed-driving output gear 235 of the low-speed-driving gear transmission mechanism 219B into the drive force transmission path in the high-speed-driving gear transmission mechanism 219A.

Fifth Embodiment

Figure 16:
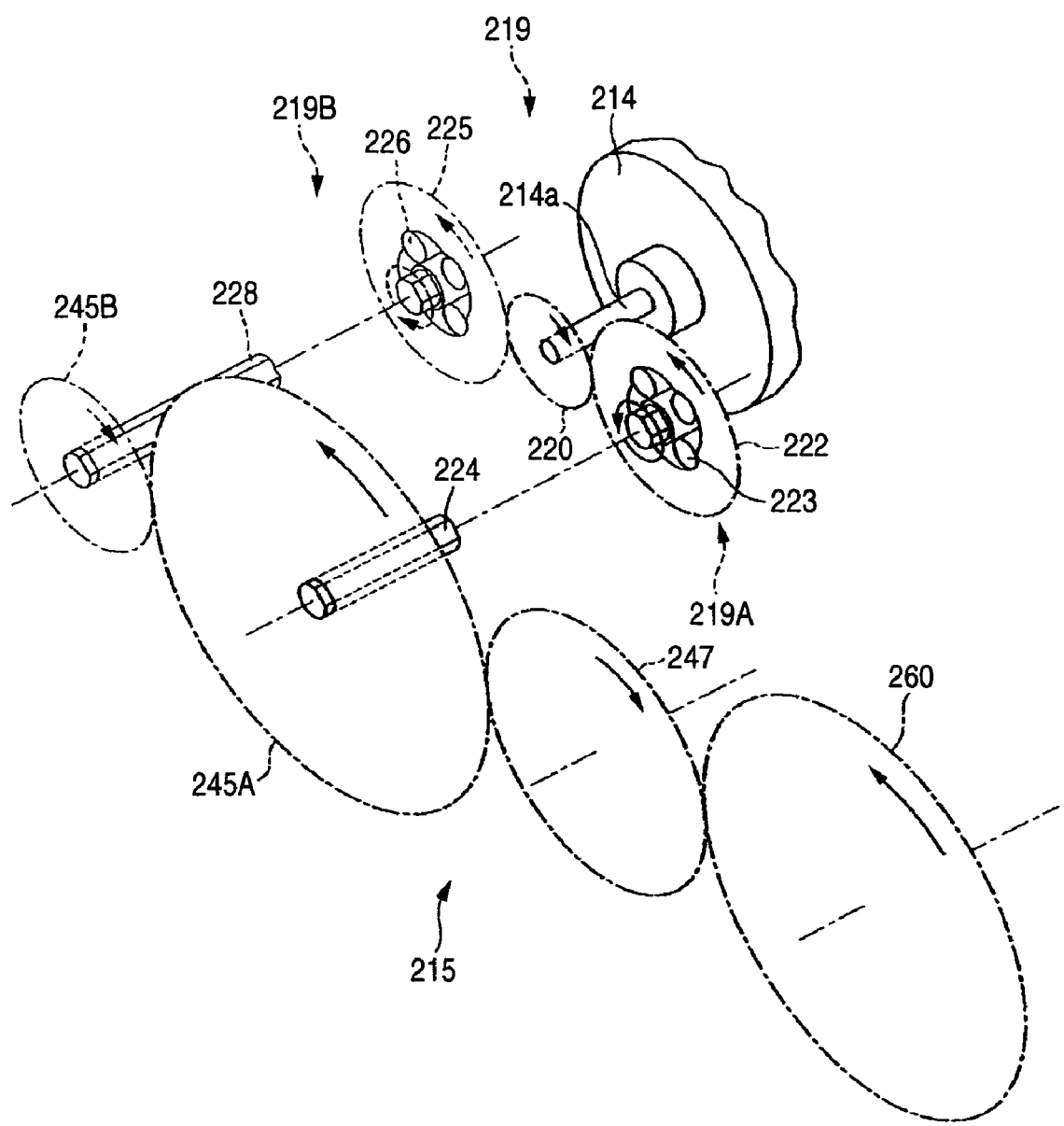
FIG. 16 is a view of a speed change unit according to a fifth embodiment, showing the power transmission path of a high-speed-driving gear transmission mechanism in a high-speed mode.
Figure 17:
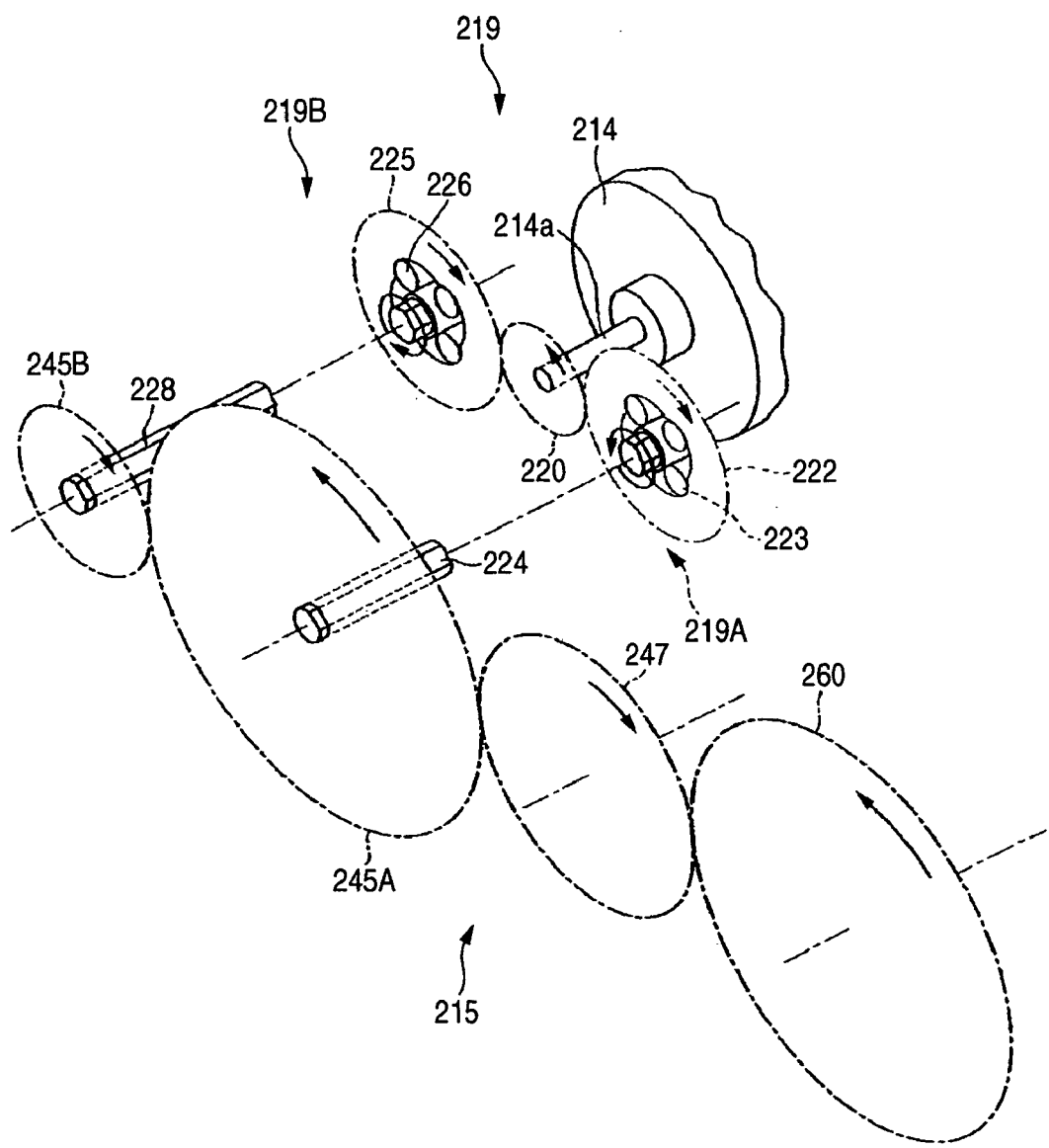
FIG. 17 is a view showing the power transmission path of a low-speed-driving gear transmission mechanism in a low-speed mode in the fifth embodiment.
Figure 18:
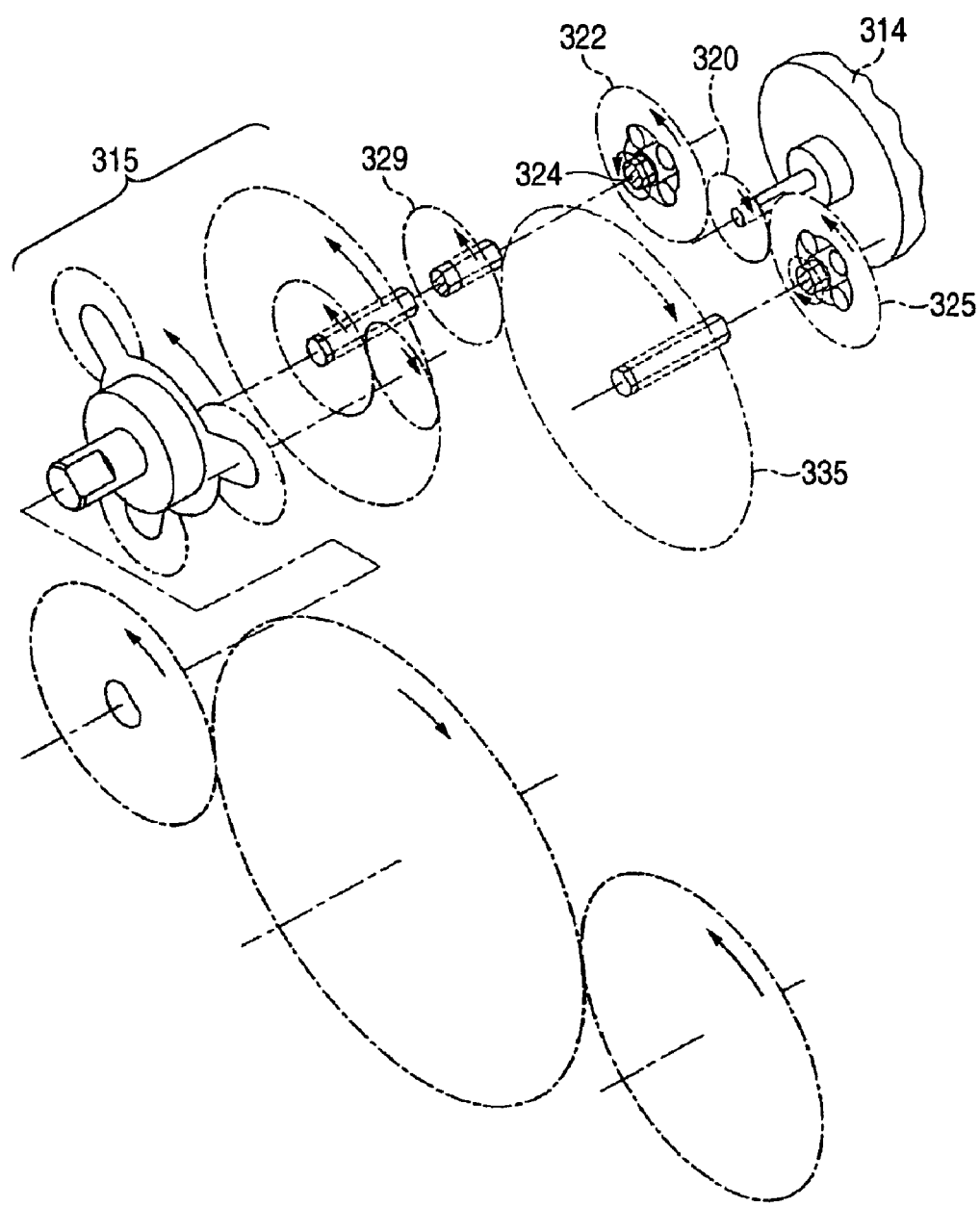
FIG. 18 is a schematic view for explaining a power transmission path in a low-speed-driving gear transmission mechanism according to a related art.

FIGS. 16 and 17 show a speed change unit according to a fifth embodiment of the invention by way of example. FIG. 16 is a view showing the power transmission path of a high-speed-driving gear transmission mechanism in a high-speed mode, and FIG. 17 is a view showing the power transmission path of a low-speed-driving gear transmission mechanism 219B in a low-speed mode.

In the above-mentioned fourth embodiment, the speed reduction mechanism 216 is disposed in the section where the speed change unit 219 is disposed, so that rotational drive force is finally transmitted through one output shaft (the first rotating shaft 224) in either of the modes. However, as shown in FIGS. 16 and 17, the speed reduction mechanism 216 may be omitted so that power is transmitted through output shafts corresponding to the respective modes.

Namely, the high-speed-driving gear transmission mechanism 219A shown in FIG. 16 is constructed so that forward driving is transmitted from the motor 214 to the first rotating shaft 224 via the high-speed-driving input gear 222 and the first one-way clutch 223, and a large-diameter drive gear 245A which constitutes the power transmission mechanism 215 is fixed to the first rotating shaft 224. On the other hand, the low-speed-driving gear transmission mechanism 219B shown in FIG. 17 is constructed so that reverse driving is transmitted from the motor 214 to the second rotating shaft 228 via the low-speed-driving input gear 225 and the second one-way clutch 226, and a small-diameter drive gear 245B which constitutes the power transmission mechanism 215 is fixed to the second rotating shaft 228. The drive gear 245A and the drive gear 245B mesh with each other, and during the high-speed mode, power is transmitted to the spool 212 side without being transmitted via the small-diameter drive gear 245B (without an increase in the motor output). During the low-speed mode, power is transmitted to the spool 212 side by undergoing a speed-reducing action due to the gear ratio of the small-diameter drive gear 245B to the large-diameter drive gear 45A.

According to the construction of the fifth embodiment, it is not only possible to obtain effects and advantages similar to those of the above-mentioned fourth embodiment, but since the speed reduction mechanism 216 need not be incorporated, the construction of the speed change unit section can be simplified and the wall thickness can also be made thin. Incidentally, in the construction shown in FIGS. 16 and 17, the right frame side of the reel body 204 shown in FIG. 12 may be formed by two sections so that the speed change mechanism can be disposed on the right frame side.

What is claimed is:
1. An electrically-powered fishing reel comprising:
 a drive motor that drives a rotation of a spool rotatably supported by a reel body;
 a mechanical speed change unit that is fitted in a drive system of the spool and switches transmission power from the drive motor to the spool between a high speed state and a low speed state;
 an electrical speed change unit that controls an amount of current to be supplied to the drive motor and performs adjustment to increase or decrease an output of the drive motor; and
 a motor output adjustment member that is fitted on the reel body and is displaceable by a predetermined displacement operation range,
 wherein the motor output adjustment member controls the electrical speed change unit to perform the adjustment by a displacement operation of the motor output adjustment member, and
 wherein the motor output adjustment member controls the mechanical speed change unit to switch the transmission power between the high speed state and the low speed state by the displacement operation within the predetermined displacement operation range.
2. The electrically-powered fishing reel according to claim 1, wherein
 the motor output adjustment member is fitted to the reel body so as to be able to rotate by a predetermined range,
 when the motor output adjustment member is rotated to a predetermined rotational operation position, the mechanical speed change unit switches the transmission power from the low speed state to the high speed state,
 a first-half rotational operation range preceding the rotational operation position is a motor output increase/decrease adjustment range of the electrical speed change unit in the low speed state, and
 a second-half rotational operation range succeeding the rotational operation position is a motor output increase/decrease adjustment range of the electrical speed change unit in the high speed state of the mechanical speed change unit.
3. The electrically-powered fishing reel according to claim 1, wherein a speed of the rotation of the spool at the time that the low speed state is switched to the high speed state is continuous.
4. The electrically-powered fishing reel according to claim 1, wherein the motor output adjustment member includes a rotatably lever.
5. The electrically-powered fishing reel according to claim 1, wherein the motor output adjustment member includes a slidable switch.
6. An electrically-powered fishing reel comprising:
 a drive motor that drives a rotation of a spool rotatably supported by a reel body; and
 a speed change unit that is connected between an output section of the drive motor and a power transmission mechanism for transmitting a rotation of the output section to the spool, and is provided with a high-speed-driving gear transmission mechanism and a low-speed-driving gear transmission mechanism,
 wherein one of the high-speed-driving gear transmission mechanism and the low-speed-driving gear transmission mechanism is selected to vary a rotational speed of the spool according to a rotating direction of the output section of the drive motor,
 wherein the high-speed-driving gear transmission mechanism includes a high-speed-driving output gear which is driven when the high-speed-driving gear transmission mechanism is selected, and the low-speed-driving gear transmission mechanism includes a low-speed-driving output gear which is driven when the low-speed-driving gear transmission mechanism is selected, and
 wherein the high-speed-driving output gear is connected to the power transmission mechanism without the low-speed-driving output gear being inserted between the high-speed-driving output gear and the power transmission mechanism.
7. The electrically-powered fishing reel according to claim 6, wherein
 the high-speed-driving gear transmission mechanism includes a first rotating shaft to which the high-speed-driving output gear is fixed,
 the first rotating shaft is common to an input shaft of the power transmission mechanism,
 the low-speed-driving gear transmission mechanism includes a second rotating shaft to which the low-speed-driving output gear is fixed and which is apart from the first rotating shaft, and
 the high-speed-driving output gear is meshed with the low-speed-driving output gear.
8. The electrically-powered fishing reel according to claim 7, wherein the high-speed-driving output gear is a large-diameter gear and the low-speed-driving output gear is a small diameter gear smaller than the large-diameter gear.
9. An electrically-powered fishing reel comprising:
 a drive motor that drives a rotation of a spool rotatably supported by a reel body; and
 a speed change unit that is connected between an output section of the drive motor and a power transmission mechanism for transmitting a rotation of the output section to the spool, and provided with a high-speed-driving gear transmission mechanism and a low-speed-driving gear transmission mechanism;

wherein one of the high-speed-driving gear transmission mechanism and the low-speed-driving gear transmission mechanism is selected according to a rotating direction of the output section of the drive motor to transmit one of high-speed rotational drive force and low-speed rotational drive force to the power transmission mechanism, and wherein the high-speed-driving gear transmission mechanism transmits a rotation of the drive motor in one direction to the power transmission mechanism without increasing the speed of the rotation, and the low-speed-driving gear transmission mechanism transmits a rotation of the drive motor in the other direction to the power transmission mechanism while decreasing the speed of the rotation.

* * * * *